(12) United States Patent
Webb

(10) Patent No.: US 10,899,089 B2
(45) Date of Patent: Jan. 26, 2021

(54) AUTOMATED FIBER PLACEMENT END EFFECTOR WITH LAMINAR GAS COOLING JET AND INFRARED IMAGE PROCESSOR FOR IN-SITU INSPECTION

(71) Applicant: The Boeing Company, Chicago, IL (US)

(72) Inventor: Sean Christian Webb, Charleston, SC (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 15/941,160

(22) Filed: Mar. 30, 2018

(65) Prior Publication Data

US 2019/0299542 A1 Oct. 3, 2019

(51) Int. Cl.
*B32B 41/00* (2006.01)
*B29C 70/38* (2006.01)
*G01N 21/88* (2006.01)
*B29L 31/30* (2006.01)
*G01N 21/84* (2006.01)

(52) U.S. Cl.
CPC ....... *B29C 70/388* (2013.01); *G01N 21/8851* (2013.01); *B29L 2031/3082* (2013.01); *G01N 2021/8444* (2013.01); *G01N 2021/8472* (2013.01)

(58) Field of Classification Search
CPC ................ B29C 70/388; B29C 70/384; G01N 21/8851; G01N 2021/8472; G01N 2021/8444; B29L 2031/3082; B64F 5/10; B64F 5/60

USPC .................... 156/60, 64, 350, 351, 378, 379
See application file for complete search history.

(56) References Cited

U.S. PATENT DOCUMENTS

| 7,555,404 | B2 | 6/2009 | Brennan et al. |
| 8,753,458 | B2 | 6/2014 | Engelbart et al. |
| 2007/0029030 | A1 | 2/2007 | McCowin et al. |
| 2012/0330453 | A1 | 12/2012 | Sangari et al. |
| 2014/0124120 | A1* | 5/2014 | Pham ............. B32B 41/00 156/64 |
| 2015/0254835 | A1 | 9/2015 | Dorris et al. |
| 2016/0102966 | A1 | 4/2016 | Grossnickle et al. |
| 2016/0346998 | A1* | 12/2016 | Mark ............. B29C 64/20 |

FOREIGN PATENT DOCUMENTS

WO  WO2016088024 A1  6/2016

OTHER PUBLICATIONS

European Patent Office Search Report, dated Sep. 17, 2019, regarding Application No. 19163633.1, 4 pages.
European Patent Office Communication, dated Oct. 7, 2019, regarding Application No. 19163633.1, 3 pages.
Krankenhagen et al, "Thermographic rotor 15 blade inspection from larger distances, a promising tool for the maintenance of wind turbines," 19th World Conference on Non-Destructive Testing 2016, Jan. 1, 2016, 8 pages.

(Continued)

*Primary Examiner* — Michael N Orlando
*Assistant Examiner* — Joshel Rivera
(74) *Attorney, Agent, or Firm* — Yee & Associates, P.C.

(57) ABSTRACT

An inspection device. The inspection device includes a gas dispenser aimed at a workpiece; and a camera aimed at a gas impingement point on the workpiece.

23 Claims, 17 Drawing Sheets

(56) References Cited

OTHER PUBLICATIONS

Rau et al., "Enhanced Two-Phase Impingement Technologies for Electronics Cooling," School of Mechanical Engineering, Purdue University, Apr. 14, 2016, 13 pages.
New et al., "Dynamics of laminar circular jet impingement upon convex cylinders," Physics of Fluids, vol. 27, Issue 2, 10.1063/1.4913498, Feb. 2015, 8 pages, Abstract only.
Abdel-Fattah et al., "Behavior of air jet impinging on curved surfaces," Journal of Aerospace Engineering, vol. 27 Issue 5—Sep. 2014, 2 pages, Abstract only.
Kendoush et al, "Theory of stagnation region heat and mass transfer to fluid jets impinging normally on solid surfaces," Chemical Engineering and Processing: Process Intensification vol. 37, Issue 3, May 1998, pp. 223-228, 2 pages, Abstract Only.
The Netherlands Patent Office Search Report and Written Opinion and English Translation, dated Nov. 8, 2018, regarding Application No. NL2020882, 9 pages.
Janssen, "The Influence of Laminar-Turbulent Transition on the Performance of a Propeller," Delft University of Technology, Apr. 24, 2015, 126 pages.

\* cited by examiner

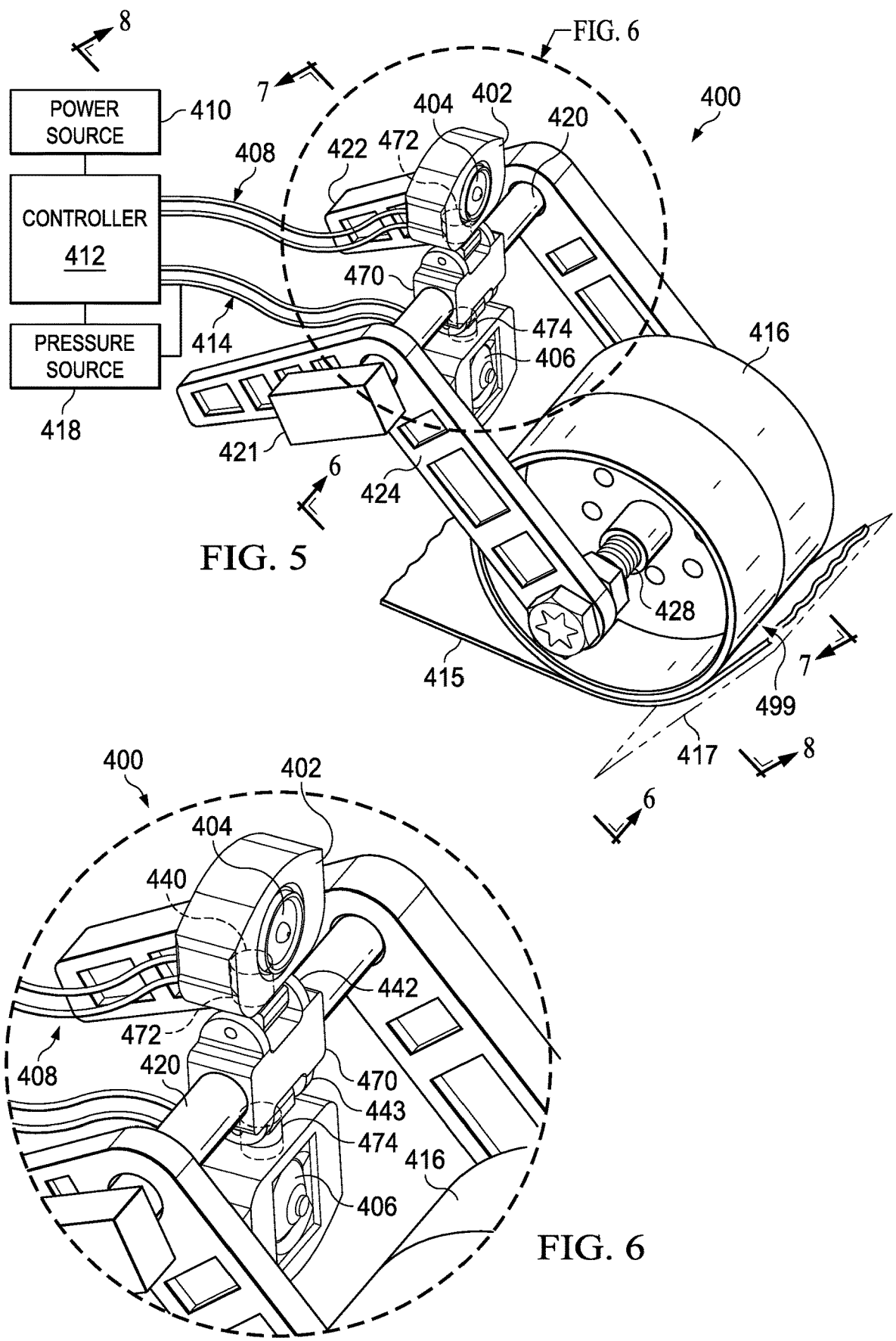

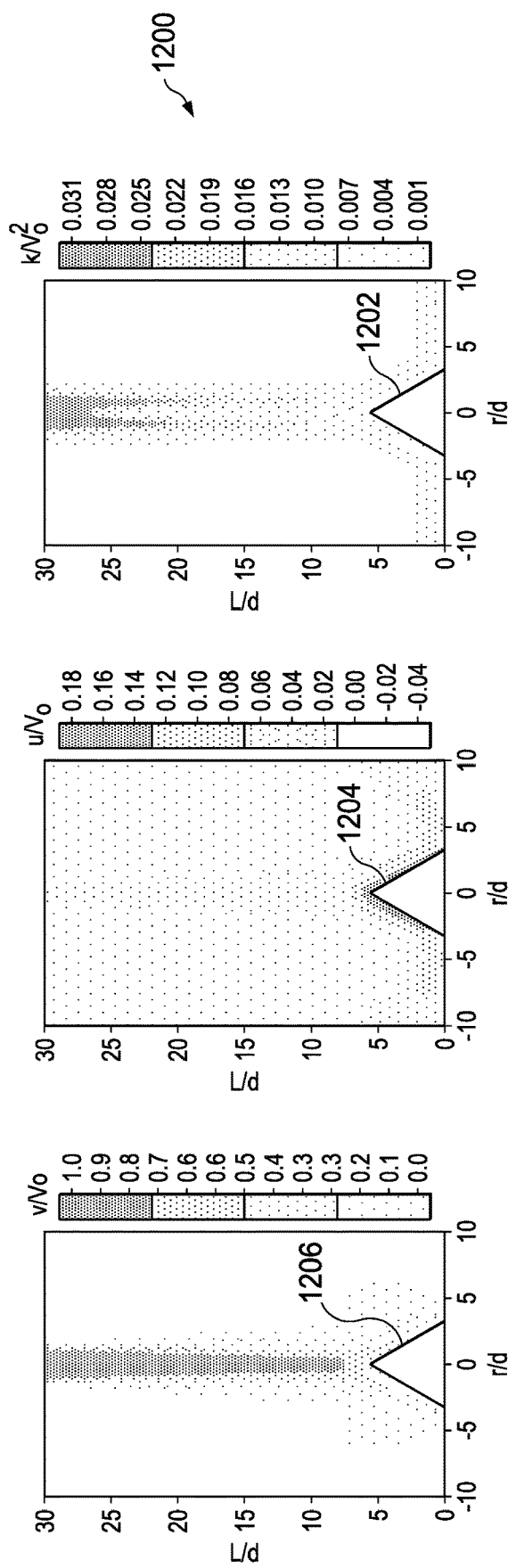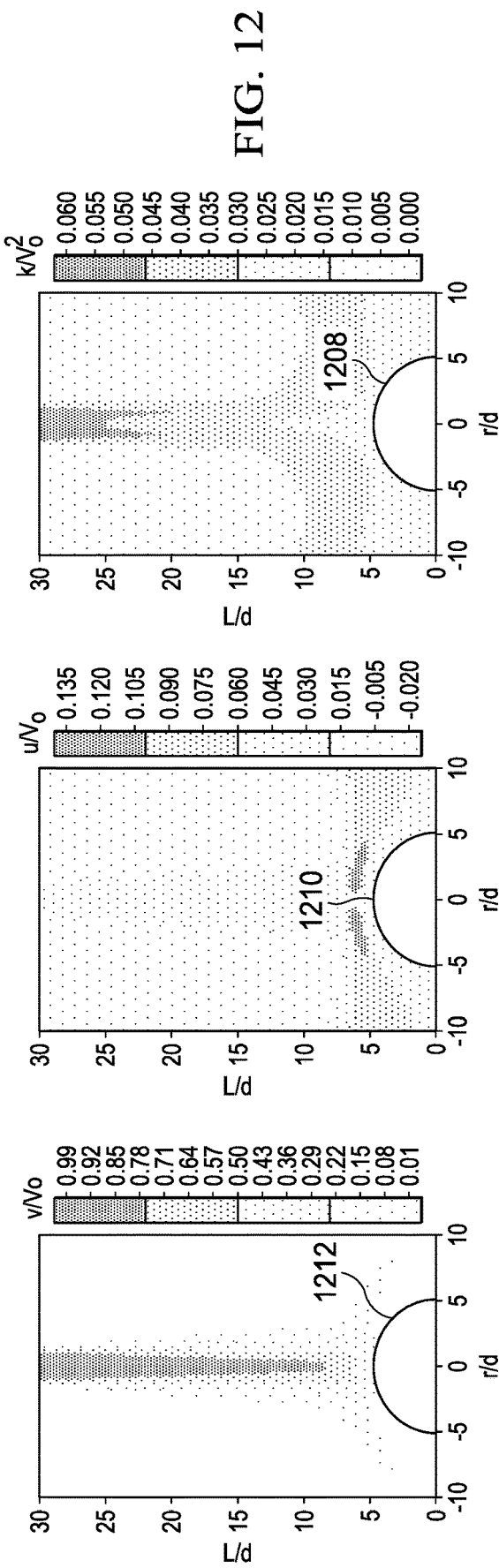
FIG. 12

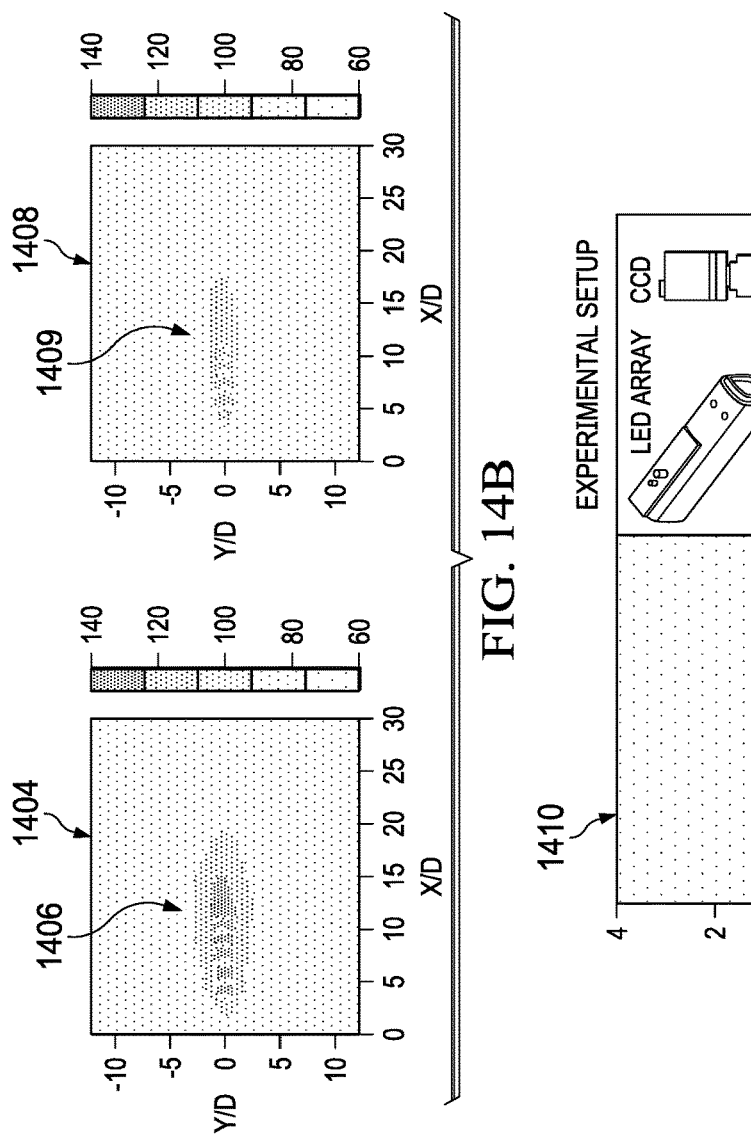
FIG. 14B
FIG. 14A
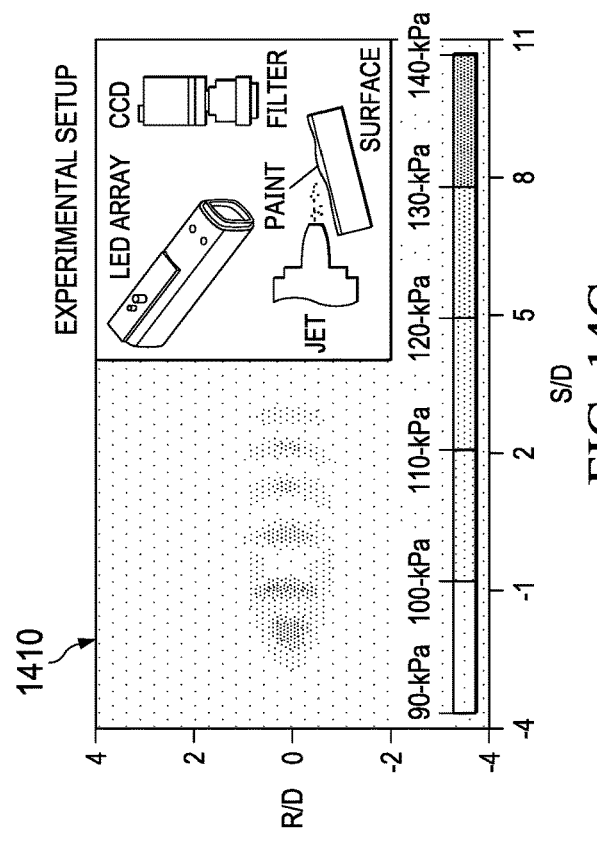
FIG. 14C

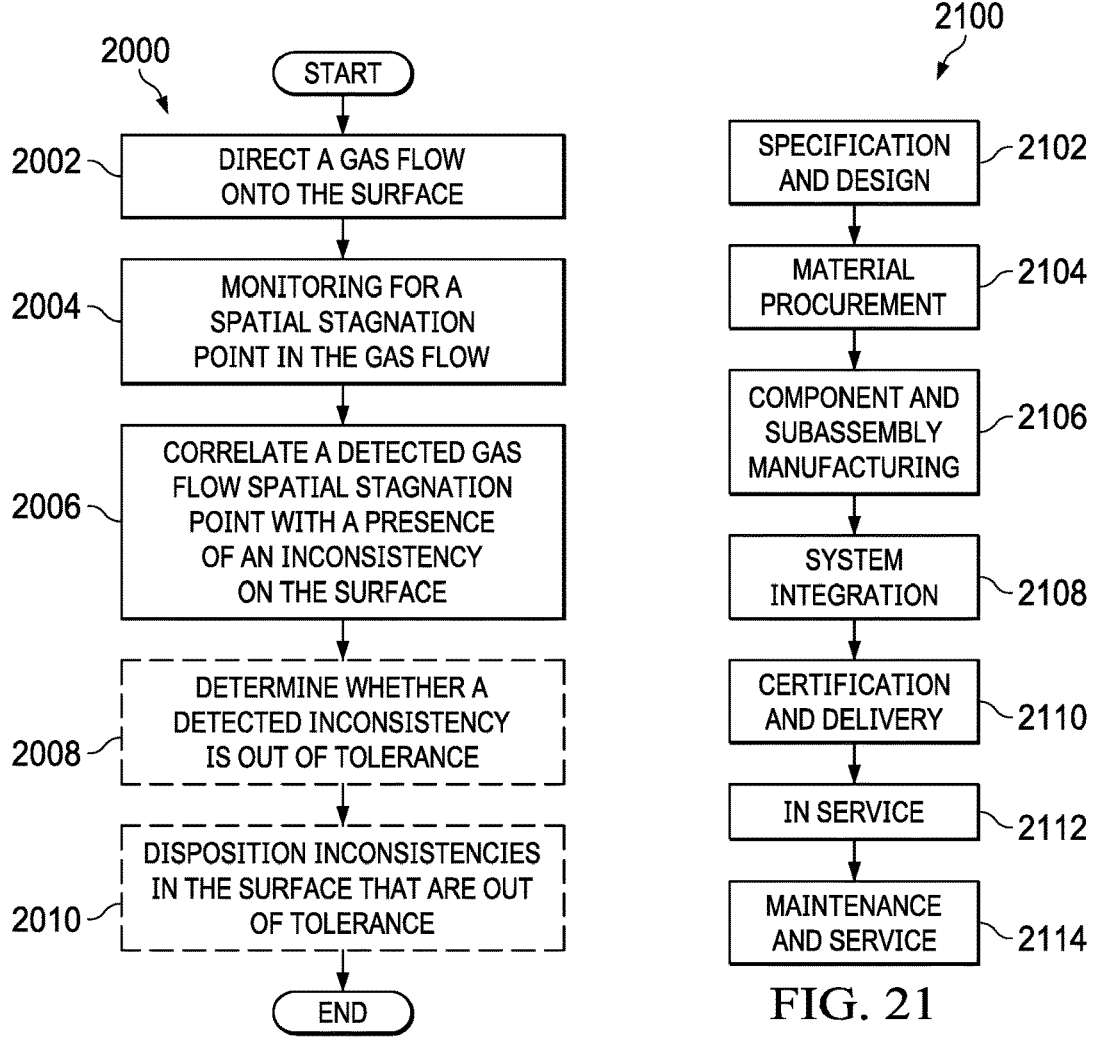
FIG. 20
FIG. 21
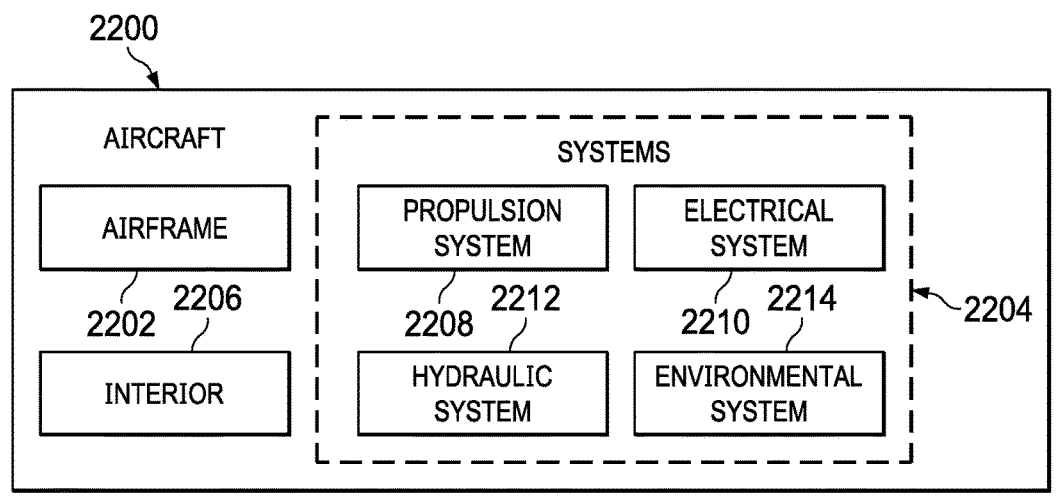
FIG. 22

AUTOMATED FIBER PLACEMENT END EFFECTOR WITH LAMINAR GAS COOLING JET AND INFRARED IMAGE PROCESSOR FOR IN-SITU INSPECTION

BACKGROUND INFORMATION

1. Field

The present disclosure relates generally to fabrication of layered composite materials, and more specifically, to methods and systems for automated fiber placement ply wrinkle and foreign object debris inspection.

2. Background

Composite structures such as those used for aerospace applications may be fabricated using automated fiber placement (AFP) machines that lay down relatively narrow strips of pre-impregnated tows or slit composite tape onto a manufacturing tool, such as a mandrel. AFP machines can include multiple groups, or tows arranged adjacent as a conformal band onto the tool. The tows are fed by spools of tape prepreg composite carried on the end effector and supplied to a plurality of compaction rollers that apply and compress the tow band onto the tool or mandrel.

Current techniques require waiting for other non-destructive inspection techniques that require the full fuselage barrel to complete fabrication and cure. Detecting an inconsistency after full fabrication can be very costly due to rework and waste. Therefore, techniques for preventing or identifying wrinkles during layup would be desirable.

Additionally, in some cases, quality inspectors are required to inspect one hundred percent of the ply placements using optical laser templates (OLT) to check ply boundaries and orientations. This method is currently the most efficient method for inspection, but this method involves a complicated process that is labor intensive and time consuming. On average, thirty or more hours is required for inspection of a full fuselage. Thus, again, techniques for preventing or identifying wrinkles during layup would be desirable.

SUMMARY

The illustrative embodiments provide for an inspection device. The inspection device includes a gas dispenser aimed at a workpiece; and a camera aimed at a gas impingement point on the workpiece.

The illustrative embodiments also provide for fabricating a portion of an aircraft using the above inspection device.

The illustrative embodiments also provide for an automatic fiber placement end effector, including: a gas nozzle connected to an end effector; and an infrared camera directed at an impingement point where a gas from the gas nozzle impinges on a surface of a workpiece. The gas nozzle and the infrared camera pointed such that both the gas is directable at a workpiece and infrared data can be taken from the workpiece.

The illustrative embodiments also provide for fabricating a portion of an aircraft using the above automatic fiber placement and end effector.

The illustrative embodiments also provide for a method of inspecting a structure. The method includes placing a tow on a tool and directing a gas flow onto the tow. The method also includes contrasting a first image derived from the gas flow on the tow with a second image derived from the tow. The first image and the second image set come from a location where the gas flow impinges on the tow.

The illustrative embodiments also provide for a portion of an aircraft assembled according to the above method.

The illustrative embodiments also provide for a method of fabricating a composite structure. The method includes applying a composite material to a surface of a workpiece. The method also includes dispensing a gas to impinge on the composite material using a nozzle. The method also includes monitoring, using a camera, gas flow patterns over the composite material that arise as a result of dispensing the gas.

The illustrative embodiments also provide for a portion of an aircraft assembled according to the above method.

The illustrative embodiments also provide for a method of fabricating a part having a coating applied to a surface of the part. The method includes applying a coating to a surface of the part. The method also includes after applying, dispensing a gas to impinge on the coating using a nozzle. The method also includes monitoring, using a camera, gas flow patterns over the coating that arise as a result of dispensing the gas.

The illustrative embodiments also provide for a portion of an aircraft assembled according to the above method.

The illustrative embodiments also provide for a method of inspecting a surface. The method includes directing a gas flow onto the surface. The method also includes monitoring for a spatial stagnation point in the gas flow. The method also includes correlating a detected gas flow spatial stagnation point with a presence of an inconsistency on the surface.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 illustrates is an isometric representation of an automatic fiber placement end effector with laminar gas cooling jet and IR image detector, in accordance with an illustrative embodiment;

FIG. 6 illustrates a magnified view of the cooling jet shown in FIG. 5, in accordance with an illustrative embodiment;

FIG. 12 illustrates a series of graphs showing flow behavior of gas jet impinging on a variety of curved surfaces, in accordance with an illustrative embodiment;

FIG. 14A illustrates a pristine flat layup surface without inconsistencies, as detected according to the illustrative embodiments, in accordance with an illustrative embodiment;

FIG. 14B illustrates an example of an inconsistency, as detected according to the illustrative embodiments, in accordance with an illustrative embodiment;

FIG. 14C illustrates and example of a pressure distribution on the impingement surface of an underexpanded jet impinging on a flat surface at an inclined angle, in accordance with an illustrative embodiment;

FIG. 20 is an illustration of a flowchart of a method of inspecting a surface, in accordance with an illustrative embodiment;

FIG. 21 is an illustration of an aircraft manufacturing and service method, in accordance with an illustrative embodiment; and FIG. 22 is an illustration of an aircraft, in accordance with an illustrative embodiment.

DETAILED DESCRIPTION

Figure 1:
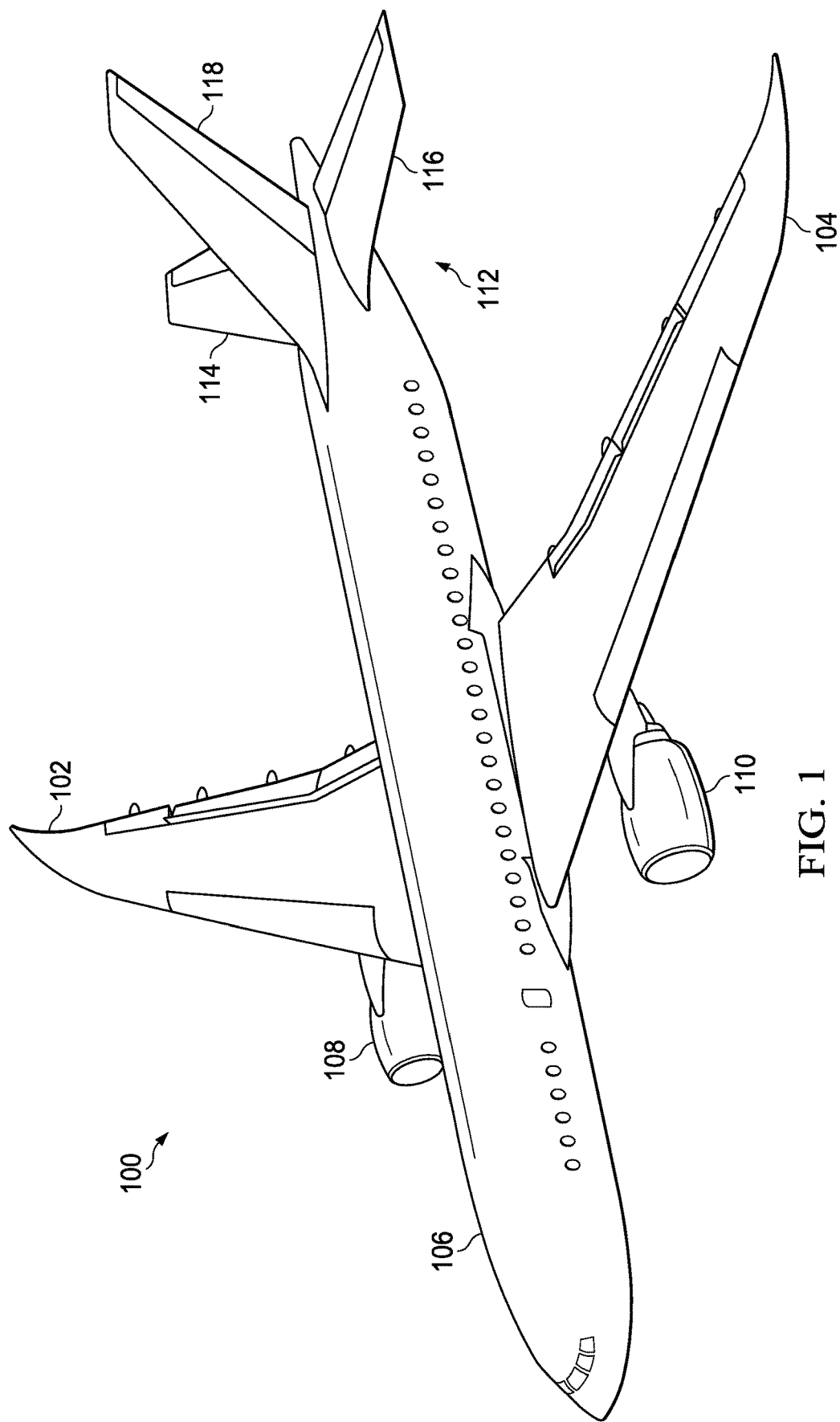
FIG. 1 illustrates an aircraft that can be fabricated using the techniques described herein, in accordance with an illustrative embodiment.

The illustrative embodiments provide for a novel automated fiber placement (AFP) end effector with cool laminar gas cooling jet and infrared image processor for in-situ, ply-by-ply wrinkle, and foreign object debris (FOD) detection in tapes and tow prepreg composite structures. As used herein the term "cool" refers to temperatures below room temperature, though the temperature of the gas flow may be 0 degrees Fahrenheit or less in some illustrative embodiments.

The illustrative embodiments also provide for a novel, thermo-fluid dynamic technique. Thus, the illustrative embodiments can be categorized within the realm of non-destructive inspection and process control techniques for automated fiber placement machines and the composite structure that is fabricated thereof. It is desirable to develop composite structures, manufacturing, and inspection methods that simplify and improve process flow thereby reducing cost, rework, and waste. The illustrative embodiments also provide a solution for instantaneous detection of inconsistencies in tape-wound composite prepreg structures. Stated differently, the illustrative embodiments provide for real time, in-situ inspection.

Thus, the methods and devices of the illustrative embodiments solve several technological challenges. For example, the illustrative embodiments may reduce the need for full ply inspection procedures by inspecting composite material as it is laid. The methods and devices of the illustrative embodiments also reduce the cost of inspection and manufacturing of composite objects. In a more specific example, the illustrative embodiments allow tape laying to proceed layer-by-layer without stopping after each layer to inspect a single layer. Rather, assuming tape laying proceeds within tolerance, the illustrative embodiments allow continuous, uninterrupted laying of plies until completion of the composite object. Yet further, the illustrative embodiments allow inspection data to be stored as inspection occurs in real time during tape laying. In this manner, the illustrative embodiments create an inspection record as composite material is laid down. Accordingly, questions raised during a later inspection can be answered by reference to the build record for the product. Still further, the illustrative embodiments distinguish in that inspection covers inspecting a whole tape width, and cumulatively, a whole ply, rather than narrow bands or points within a ply. From the above, the illustrative embodiments reduce or eliminate the need for manual inspection and/or work stopping inspections, thereby saving both the time of manufacture and the cost of manufacture.

These technical advantages provided by the illustrative embodiments are best understood in the context of composite manufacturing, though the illustrative embodiments may be applied to other types of manufacturing including applications of coatings as well as additive manufacturing techniques and subtractive manufacturing techniques. Nevertheless, for composite manufacturing, composite structures, such as those used for aerospace applications, may be fabricated using automated fiber placement (AFP) machines that lay down relatively narrow strips of pre-impregnated tows or slit composite tape onto a manufacturing tool, such as a mandrel. AFP machines can include multiple groups, or tows arranged adjacent as a conformal band onto the tool. The tows are fed by spools of tape prepreg composite carried on the end effector and supplied to a plurality of compaction rollers that apply and compress the tow band onto the tool or mandrel.

For many AFP applications, it is desirable to inspect the structure in real time to make sure out of tolerance situations are detected early. Thus, the illustrative embodiments provide for in-process detection of inconsistencies (ply wrinkles, FOD, etc).

In some cases, quality inspectors are required to inspect one hundred percent of the ply placements using optical laser templates (OLT) to check ply boundaries and orientations. This method is currently the most efficient method for inspection, but involves a complicated process that is labor intensive and time consuming. On average, thirty or more hours is needed to inspect a full fuselage. The OLT process is described as follows: The OLT unit is indexed to a cure mandrel and the appropriate ply is projected onto the surface of the composite structure currently being fabricated. An inspector then visually compares the projected template boundary to the edge of the recently placed composite ply. In general, this process is throughput limiting. For a high rate manufacturing environment, this process can be found unacceptable to meet business requirements. Some such inspection methods are known; however, existing techniques are inefficient or do not provide the same unique features of the illustrative embodiments.

For example, inspection of uncured fiber-reinforced composite components can be performed by non-contact 3D measurements of the component using 3D digital image correlation with patterned illumination. This method can be used in conjunction with an AFP machine for inconsistency detection. However, the method includes projecting a light pattern on the structure and comparing a test profile to a baseline profile. In contrast, the illustrative embodiments use infrared imagery for pattern recognition of gas flow, not visible light illumination, as the acting stimulus.

In another example, a robotic end effector may include a vacuum gripping mechanism and recording device with camera that detects, grips, and applies each ply to a tool. In this example, the end effector includes a feedback control loop with force sensor for detecting compaction force. The end effector could include a scanner that performs a pre- and post-inspection of the plies. However, in this technique, infrared imagery is not used, and visible light systems cannot detect some types of inconsistencies.

With reference now to the figures, and in particular, with reference to FIG. 1, an illustration of an aircraft is depicted in accordance with an illustrative embodiment. Aircraft 100 is an example of an aircraft which may be constructed and inspected using the techniques described herein.

In this illustrative example, aircraft 100 has wing 102 and wing 104 attached to body 106. Aircraft 100 includes engine 108 attached to wing 102 and engine 110 attached to wing 104. Aircraft 100 could be any other aircraft, such as a prop aircraft, a helicopter, or some other moveable platform such as an automobile, boat, or even a building constructed from composite materials.

Aircraft 100 may have other features. For example, body 106 has tail section 112. Horizontal stabilizer 114, horizontal stabilizer 116, and vertical stabilizer 118 are attached to tail section 112 of body 106.

Figure 2:
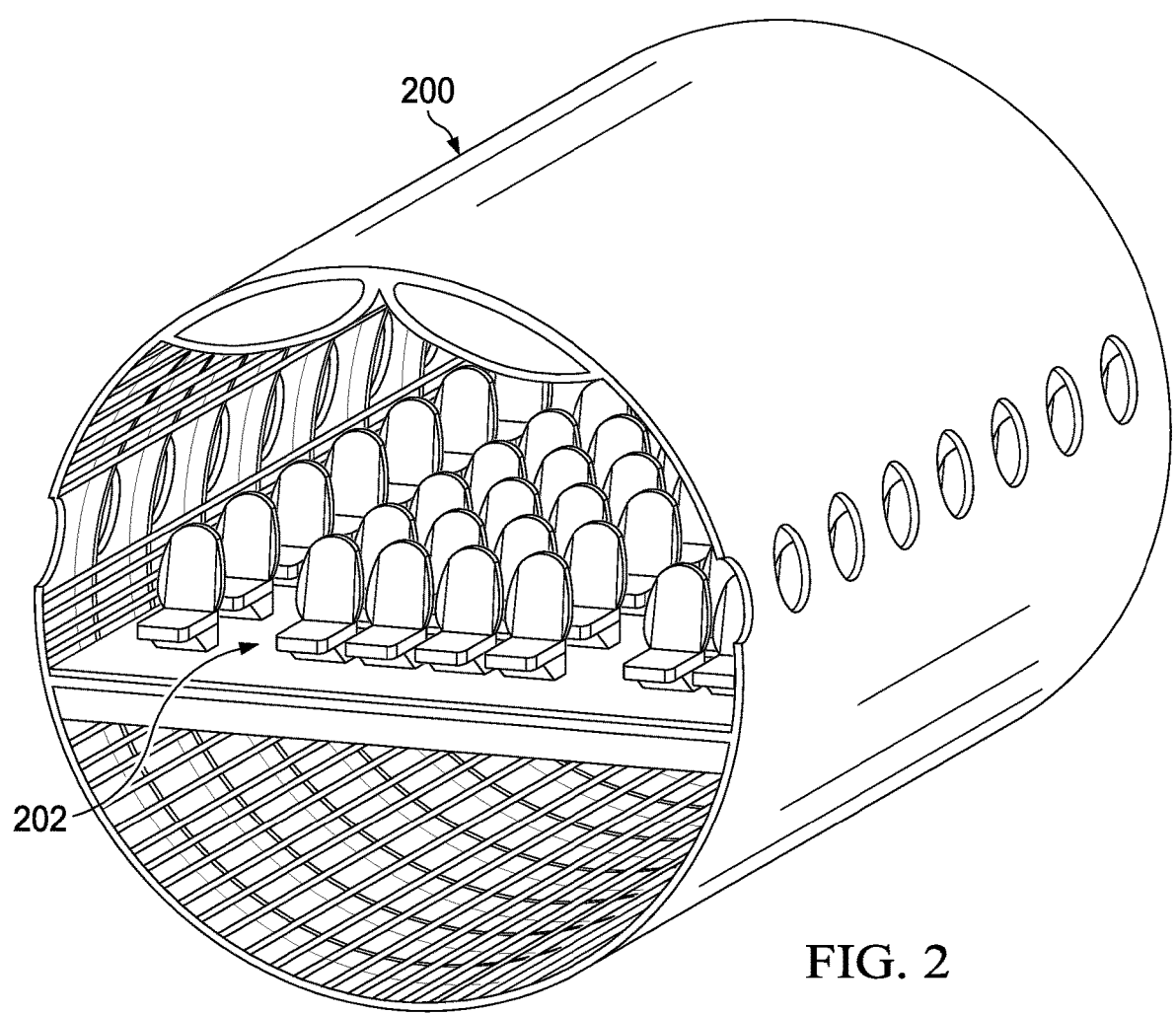
FIG. 2 illustrates an isometric, perspective view of a commercial passenger aircraft with composite fuselage that is fabricated using the automated fiber placement techniques described herein, in accordance with an illustrative embodiment.

FIG. 2 illustrates an isometric, perspective view of a commercial passenger aircraft with composite fuselage that is fabricated using the automated fiber placement techniques described herein, in accordance with an illustrative embodiment. Fuselage 200 may be body 106 of FIG. 1.

In FIG. 2, fuselage 200 has been cut away to show seats 202. While substantially reduced in scale, the relative scale of the size of seats 202 to fuselage 200 is roughly accurate. Thus, the scale of the composite layup and inspection problem becomes apparent. The illustrative embodiments address this problem with the cool gas jet automatic fiber placement end effector and associated techniques described herein.

Figure 3:
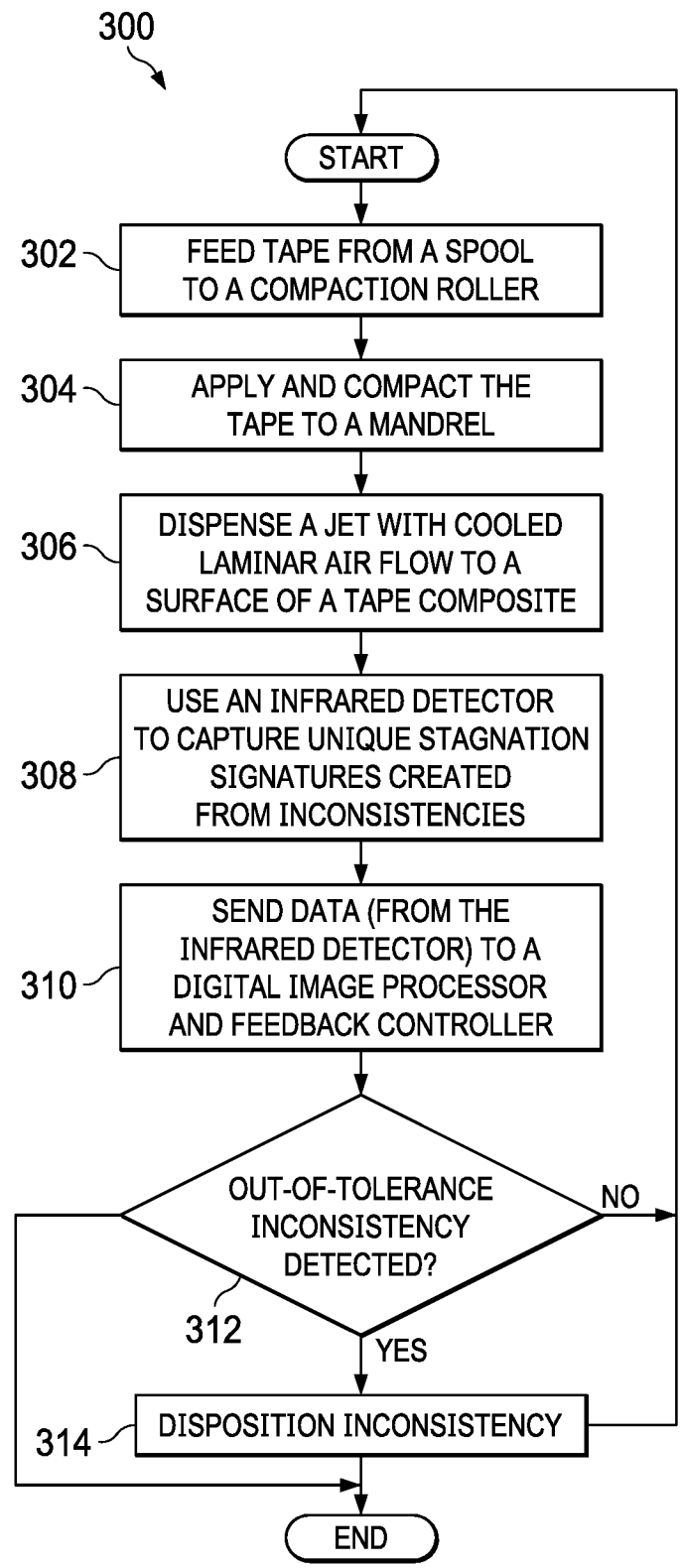
FIG. 3 illustrates a flowchart of a process for laying tape on a surface, in accordance with an illustrative embodiment.

FIG. 3 illustrates a flowchart of a process for laying tape on a surface, in accordance with an illustrative embodiment. Method 300 may also be characterized as a method of composite structure formation combined with inconsistency detection using an end effector having a cooling jet and an infrared camera.

Method 300 begins by feeding tape from a spool to a compaction roller (operation 302). Next, method 300 includes applying and compacting the tape to a mandrel (operation 304). Method 300 then includes dispensing a jet with cooled laminar gas flow to a surface of a tape composite (operation 306). In one illustrative embodiment, gas may be dispensed tangent to the surface, normal to the surface, or at some angle with respect to the surface, depending on the particular implementation.

Next, method 300 includes using an infrared detector to capture unique stagnation signatures created from inconsistencies (operation 308). Method 300 then includes sending data (from the infrared detector) to a digital image processor and feedback controller (operation 310).

A determination is then made whether an out-of-tolerance inconsistency is detected (operation 312). If not, then the process continues by returning to operation 302. However, in some cases when the workpiece is complete, method 300 may terminate thereafter. If an out-of-tolerance inconsistency is detected, then the inconsistency is dispositioned (operation 314). Inconsistencies within tolerance are typically acceptable without further consideration. Inconsistencies out of tolerance would need to be dispositioned as acceptable after some type of analysis, or dispositioned as not acceptable and in need of rework or scrap after some type of analysis. Dispositioning the inconsistency may include reworking the inconsistency, discarding the workpiece and starting its manufacture over again, noting the inconsistency, or simply ignoring the inconsistency if some other factor indicates that labeling of the inconsistency as being out-of-tolerance should be overruled. If the workpiece is not complete, then the process may return to operation 302 and repeat; otherwise, method 300 may terminate thereafter.

Stated differently, the end effector components are positioned such that the tape roller is at the leading edge, then the gas jet is positioned just aft of the roller, and the infrared camera is positioned just aft or at the centerline of the gas jet and can be in-plane of the gas jet or orthogonal to the gas flow stream. From this sequential positioning, the invention is part of a ternary (i.e., three-part) process that occurs continuously and simultaneously during the fabrication process as the tool is rotated and the automatic fiber placement arm translates. Again, gas may be dispensed tangent to the surface, normal to the surface, or at some angle with respect to the surface, depending on the particular implementation.

Similar to the above description for method 300, this process can be described as follows: First tape, in the form of tows, is applied to existing fuselage tool. Second, the gas jet disperses cooled laminar gas across the rolled tape at pre-cure temperatures which acts as a sensing stimulus for the inspection technique, and also prevents initializing cure of the prepreg material. Third, the infrared camera and feedback controller detects inconsistencies in the topographical and spatial stagnation points of the cool gas as it flows across the tape surface. Fourth, the gas flow is differentiated by the detector due to the contrast in temperature the flow provides compared to the ambient temperature of the existing tape and mandrel tool. The sensing mechanism operates immediately as the flow is dispersed. The sensing mechanism is designed to work in this manner as excessive and continuous dispersal of the cool gas on the same surface will eventually cool the surface inconsistency to a similar cooled temperature, and reduce the contrast resolution of the infrared data. Fifth, corrective action can be taken at each ply if needed rather than waiting for other non-destructive inspection techniques that require the full fuselage barrel to complete fabrication and cure. Detecting an inconsistency after full fabrication can be much more costly due to rework and waste. Depending on the type and placement of the inconsistency, the entire part might have to discarded and rebuilt. In other cases, the overlying structure that could be within tolerance is removed to disposition the buried inconsistency that is outside of tolerance.

Compared to a smooth regular tape ply without wrinkle, void, or foreign object debris, the gas flow across a surface inconsistency will not present a single stagnation point that is concentric with the gas jet applicator. Rather, similar to that observed from meteorological or satellite imagery of cloud systems that are shaped and formed as they move across mountainous terrain, when the cool gas flows across a wrinkle in the composite skin structure, the infrared camera will detect unique gas flow patterns and illustrative inconsistency signatures that are associated with distorted ply surfaces.

In some illustrative embodiments, the tape is heated and compressed as part of the tape laying process. In this case, an inconsistency in the heated tape would further contrast with the cool laminar gas. Thus, in this illustrative embodiment, contrasting infrared detection of the contrasting temperatures is easier, especially initially prior to cool down of the heated tape.

Flow visualization of the cooled laminar flow is completed through infrared photogrammetry, in which topographical features of the flow can be numerically mapped using digital imaging processing. Infrared photogrammetry is one of several such techniques commonly practiced in industry for gas flow visualization (i.e., Schlieren shadowgraphs and laser velocimeters). Aerodynamic flow visualization is analogous to eddy current techniques. For this particular application, infrared photogrammetry is leveraged in conjunction with a computational technique such as digital image correlation to calculate surface distortion, and alert the fabrication team if an inconsistency is beyond a process control threshold. This threshold may be predetermined based on testing and structural analysis.

The illustrative embodiments contemplate different modes of operation of the illustrative embodiments. Thus, the illustrative embodiments are not limited to only image comparison. For example, across the spatial geometric surface being inspected, the infrared camera may be used to gather a numerical database of intensities with high resolution. In a specific, non-limiting example, each 0.5" cm×0.5" cm square centimeter surface may be assigned a numeric value of infrared light intensity. The contrast in intensities of inconsistent surfaces is compared to pristine surfaces in order to detect inconsistencies. This square centimeter surface sample is defined as a "pixel" when reconstructing the image. The image is thereby made of many "pixels", depending on the camera resolution.

Thus, the contrasting method can be as simple as comparing the numerical light intensity values (assigned to each pixel) of a pre-defined or pre-measured pristine surface which resides in a database. The controller continuously compares the pre-defined data to the data taken in real time in order to detect inconsistencies.

Thus, for example, the illustrative embodiments can also include contrasting a first data set of the gas flow on the tow with a second data set of the gas flow on the tow. The method also includes sensing for inconsistencies, and especially inconsistencies which are out of tolerance, on the tow based on a contrast between the first data set and the second data set. The first data set is in the form of an image or pixelated light intensity of the tow without inconsistency obtained beforehand in a laboratory setting or during process implementation. The first data set is the nominal representation of the pristine, ideally impacted tow surface, also known as the 'control'. The second data set is in the form of an image or pixelated light intensity of the tow, but is not a representative sample, but rather it is the raw 'as measured' diagnostic. The second data set is used as a metric for determining conformance to specification or requirements, and can be representative of regular or irregular gas flow.

FIG. 4 through FIG. 9 show various perspectives of a tape laying device. Thus, objects common to these figures contain similar reference numerals. FIG. 4 through FIG. 9 show different views of the same device. The various isometric renderings of the Figures may help the reader conceptualize the components and their connectivity three-dimensional space.

Figure 4:
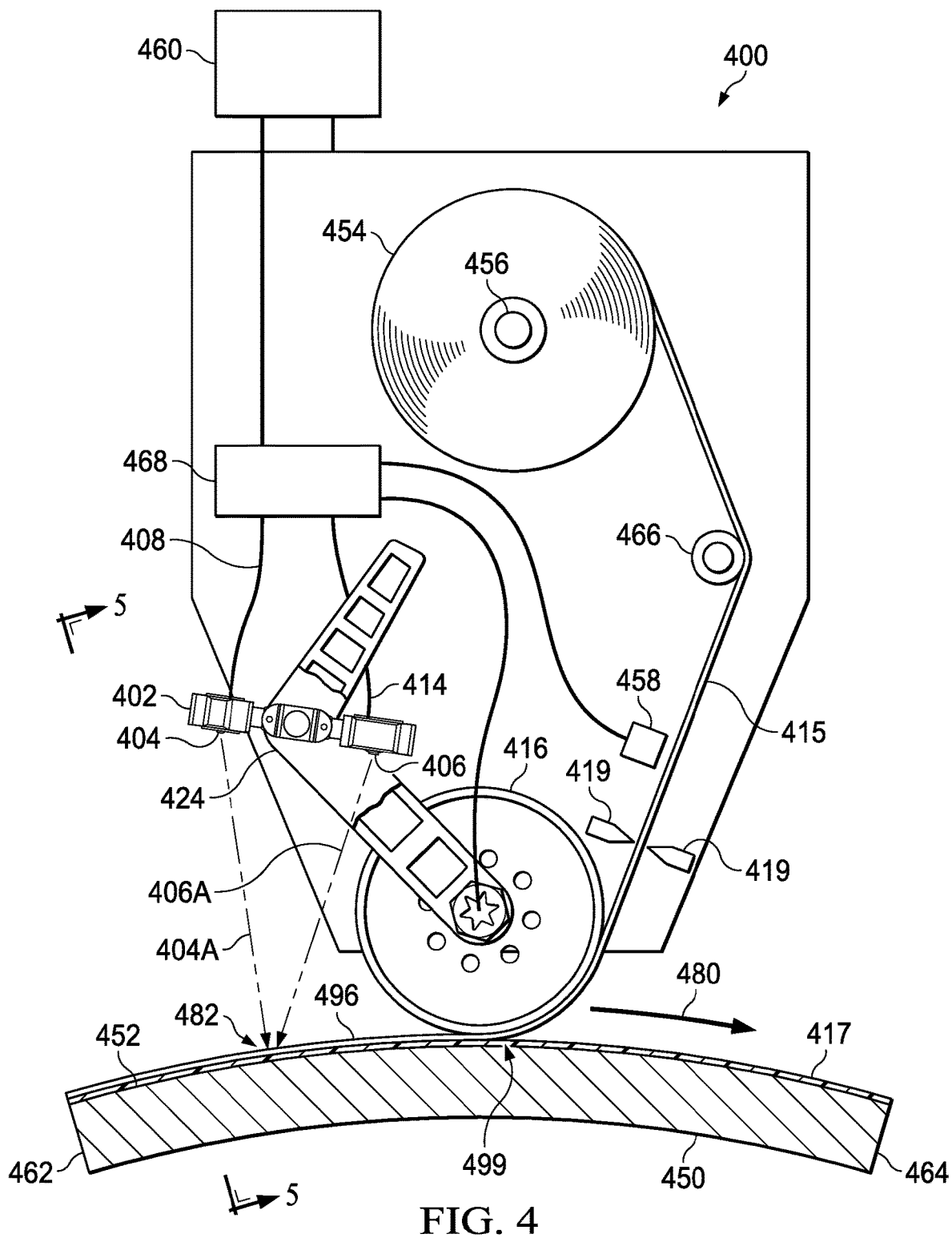
FIG. 4 illustrates an apparatus for disposing an elongate tape during formation of a composite member, in accordance with an illustrative embodiment.

FIG. 4 illustrates an apparatus for disposing an elongate tape during formation of a composite member, in accordance with an illustrative embodiment. FIG. 4, there is schematically illustrated an apparatus 400 for disposing an elongate tape 415 during formation of a composite member 417, according to one embodiment of the present invention. Composite member 417 also may be referred-to as a workpiece. Composite member 417 is laid up onto mandrel 450 by application of tape 415. Layer 496 is tape 415 just after having been laid. Apparatus 400 is an example of an apparatus that may receive or be modified to receive apparatus 400 of FIG. 5 through FIG. 9.

The apparatus 400 can be used to form composite members 417 of a variety of materials and having various configurations. In particular, the apparatus 400 can be used to dispose one or more pieces of elongate tape 415 that includes a reinforcement material, typically unidirectional fiber, disposed in a matrix material. The tape 415 can be provided in various sizes and shapes, typically being long rectangular strips having a width of 3 inches, 6 inches, or 12 inches. The strips are cut to length by cutter 419 near the roller nip 499 with the layup surface. Typically, the reinforcement material in tape 415 is a plurality of fibrous members such as fibers, strands, braids, woven or nonwoven mats, and the like of materials such as fiberglass, metal, minerals, conductive or nonconductive graphite or carbon, nylon, aramids such as KEVLAR®, a registered trademark of E.I. du Pont de Nemours and Company, and the like.

Each tape 415 typically includes the matrix material, in which the reinforcement members are disposed. In some cases, however, the tape 415 can be formed without the matrix material, and the matrix material can be disposed separately. In any case, the matrix material can include various materials such as thermoplastic or thermoset polymeric resins. Exemplary thermosetting resins include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins include liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene perfluoromethylvinylether (MFA); ketone-based resins, including polyetheretherketone (PEEKTM®, a trademark of Victrex PLC Corporation, Thointons Cleveleys Lancashire, UK); polyamides such as nylon-6/6, 30% glass fiber; poly ethersulfones (PES); polyamideimides (PAIS), polyethyl enes (PE); polyester therrmoplastics, including polybutylene terephthalate (PBT), polyethylene terephthalate (PET), and poly(phenylene terephthalates); polysulfones (PSU); poly(phenylene sulfides) (PPS).

As discussed further below, the tape 415 can be disposed to define a desired configuration of the composite member 417. In particular, the tape 415 can be disposed to form members of various sizes and shapes. The unidirectional tape is typically laid side-to-side at a particular orientation for an entire ply and may have a different orientation in subsequent plies. For example, the composite member 417 can be for a wing and/or fuselage of an aircraft, or any other suitable component. In other embodiments, the composite member 417 can be used as other airfoils, aircraft body panels, other members for aerospace vehicles and structures, structural members of automobiles, marine vehicles or other vehicles, and the like. In some cases, the composite member 417 can define a complex geometry, e. g., one or more contours that are curved about multiple axes, define bends, apertures, or other irregular shapes, and the like. The apparatus 400 can generally define a tape placement head that is used to dispose the elongate tape 415 in a configuration corresponding to the desired shape of the composite member 417.

For example, as illustrated in FIG. 4, the apparatus 400 can dispose the elongate tape 415 onto a mandrel 450, i.e., a tool with, in this case an inner mold line (IML) surface 452 that is then imparted to the tape 415 and, hence, the composite member 417. Tape is laid continuously, or perhaps non-continuously in different illustrative embodiments, by moving apparatus 400 in the direction along arrow 480. Alternatively, composite member 417 could be rotated under apparatus 400, or both composite member 417 and apparatus 400 may be moved relative to each other.

It is appreciated that various types of mandrels can be used, and the mandrel 450 can define a variety of contours. In particular, the surface 452 of the mandrel 450 can define a complex contour on which it would be challenging to place tapes. Also, while it is generally described herein that the tape 415 can be disposed "on" the mandrel 450, it is appreciated that a first layer of the tape 415 may be disposed directly on the mandrel 450 and subsequent layers may be disposed on the prior layers. The apparatus 400 includes a supply of one or more elongate tape 415, which is dispensed and disposed onto the surface 452.

For example, the tape 415 can be supplied in a dispenser, such as a roll 454 that is supported on a spool 456 mounted in the apparatus 400. In some cases, the dispenser can include multiple rolls or other supply devices that provide multiple tape 415 to be simultaneously disposed on the mandrel 450. Note that it is possible to place multiple units 400 in parallel to lay parallel tapes simultaneously on a surface. Alternatively, a single tape 415 can be disposed in one or more portions. For example, a single tape 415 can be severed into multiple portions that are disposed successively on the mandrel 450, or the single tape 415 can be disposed continuously on the mandrel 450 as a single piece without being severed. That is, the "plurality of tapes" or "multiple tapes" referred to herein can be disposed as a single piece of tape that defines a plurality of adjacent elongate portions.

In the embodiment illustrated in FIG. 4, the spool 456 supporting the roll 454 is rotatably mounted so that the tape 415 can be dispensed therefrom. The tape 415 is supplied from the roll 454 to a placement guide that controls the placement of the tape 415 on the mandrel 450. The placement guide can be a compaction roller 416, as shown, that is rotatably mounted so that the apparatus 400 can be moved over the surface 452 of the mandrel 450 with the compaction roller 416 in rolling contact therewith.

Thus, the apparatus 400 can apply a force via the compaction roller 416 in a direction generally towards the mandrel 450 so that the compaction roller 416 exerts compaction pressure on the tape 415 to press it against the mandrel 450 and/or prior applied plies in a compaction region or compaction nip. The compaction roller 416 can also be adjustably mounted by mounts, such as L-Bracket 424, which can adjust relative to the rest of the apparatus 400 so that the compaction roller 416 can apply varying pressures against the tape 415 and mandrel 450 or otherwise control the placement of the tape 415. Heating device 458 may be provided to heat tape 415.

While compaction roller 416 is depicted, other types of compaction devices may be utilized, such as a compaction shoe or a press. The apparatus 400 is moved relative to the mandrel 450 by a drive assembly 460, which is schematically indicated in FIG. 4. The drive assembly 460 can include various drive devices such as pneumatic or hydraulic actuators, electrical motors or servos, and/or chain, gear, or shaft drive mechanisms. The drive assembly may be an end effector on a robot. The drive assembly 460 can be configured to move the apparatus 400 or the mandrel 450 to achieve the desired relative placement of the apparatus 400 relative to the mandrel 450 for disposing the tape 415 over the surface 452 of the mandrel 450.

Typically, the apparatus 400 is moved generally linearly along arrow 480 along the surface 452 of the mandrel 450 in multiple passes, with one or more portions of the tape 415 being disposed in each pass. For example, the apparatus 400 can move from a first end 462 of the mandrel 450 to an opposite end 464 to dispose one or more pieces of tape 415, then return to the first end 462 to start another pass in the same direction to dispose additional tape 415 relative to tape disposed in the previous pass. Apparatus 400 can also lay tape in the reverse direction from side 462 to side 464.

Alternatively, the apparatus 400 can wrap one or more tapes 415 in continuous passes around the mandrel 450, with the position and/or direction being adjusted between each pass so that the tape 415 is disposed in adjacent portions. Additionally, the direction of the pass may be also dependent upon the orientation of the ply being applied.

The apparatus 400 can also include various other components. For example, roller 466 can be used to guide the tape 415 through the apparatus 400, as well as control tape tension. Any number of rollers can be provided, and in some cases, some or all of the rollers can be driven by a motor or other actuator to control the motion of the tape 415, such as drive assembly 460. In another illustrative embodiment, the rollers could be unpowered, but biased tensioned or not under tension.

In addition, the apparatus 400 typically includes a heating device 458 for heating the tape 415 and/or the mandrel 450. The heating device 458 can be a laser, a laser diode array, a hot gas torch, an electric heater, an infrared heater or the like. The heating device 458 typically delivers sufficient energy to permit the tape 415, once subjected to the compaction forces, to tack to the underlying tape 415. The heating device 458 can include multiple independent heating elements, such as multiple laser diodes that form an array. Each heating element can be coupled to a power source in a manner independent of the other laser diodes so that the operating power of each heating element can be controlled independently of the other heating elements. Heater 458 is typically located near compaction nip 499, though the location shown is exemplary only and does not limit the illustrative embodiments to other placements of heater 458. Specifically, other locations near the compaction nip are contemplated.

Non-uniform heating of the zones may be desirable, for example, if the tape 415 is not the same size or are not made of the same materials and thus require different amounts of energy to attain their optimum temperature for placement. Also, different amounts of heating may be desirable due to the geometry of the mandrel 450. The heating device 458 can electrically communicate with a controller 468 configured to control the heating device 458. The controller 468 can also perform other functions, for example, functions integral to inspection, speed control, temperature and velocity sensing, defect marking, and the like.

For example, the apparatus 400 can have effector frame 402 that includes cameras, temperature sensors, pre-placement detectors, tack monitoring devices, and the like for monitoring the tape 496 after having been laid, as described with respect to FIG. 5 through FIG. 9. Additionally, the apparatus 400 can include a marking device (not shown) for marking defects or other designated portions of the composite member 417.

Effector frame 402 may be effector frame 402, as shown in FIG. 5 through FIG. 9. Again, effector frame 402 supports camera array 404 and gas nozzle 406. Thus, the FIG. 4 illustrates how an automatic tape laying apparatus can be modified to include the illustrative embodiments described herein.

In use, both camera array 404 and gas nozzle 406 may be pointed at gas impingement point 482, as indicated by arrow 404A and arrow 406A. Gas impingement point 482 is the point where laminar gas flow from gas nozzle 406 impinges on surface 452 of tape 496. Thus, arrow 404A represents a center of a line of sight of camera array 404 and arrow 406A represents a direction of a central axis of an air flow emitted from gas nozzle 406. As shown, gas impingement point 482 is located on recently laid tape 496, which is to be inspected immediately after being laid. In an illustrative embodiment, the line of sight of the camera array 404 is aimed at impingement point 482 to view possible non laminar flow over the just laid tape 496 The details regarding how video data from camera array 404, taken by observing the gas flow from gas nozzle 406 on gas impingement point 482, can be used to inspect just laid tape 496 are described further, below. Note that the term "gas impingement point" contemplates not only a single point on the tape, but also entire areas of the tape, including an entire width of tape 415 and even possibly an area that includes multiple tape widths that might be laid concurrently and parallel to just laid tape 496.

The gas nozzle 406 and camera array 404 are aimed at impingement point 482 on the just laid tape 496 near the compaction nip 499. The impingement point 482 shown is for illustration only, as the impingement point 482 could be even closer or upstream to the compaction nip 499 or further downstream or away from the compaction nip 499 than shown. The impingement point 482 is also the inspection point.

FIG. 5 illustrates is an isometric representation of an automatic fiber placement end effector with laminar gas cooling jet and IR image detector, in accordance with an illustrative embodiment. Apparatus 400 may be used with the techniques described, such as method 300 of FIG. 3, to build components such as aircraft 100 of FIG. 1 or fuselage 200 of FIG. 2. FIG. 5 is an alternative view of apparatus 400 shown in FIG. 4, though with various components not shown in order to emphasize certain features in the view presented in FIG. 5. Note that these features may be varied; for example, not all devices need to have additional rollers, such as roller 466 in FIG. 4. Other various are also possible.

Turning now to FIG. 5, apparatus 400 includes effector frame 402 which supports camera array 404 and gas nozzle 406. Camera array 404 may be a high-resolution charged couple device (CCD) configured to detect infrared wavelengths. In one illustrative embodiment, camera array is an infrared camera, though cameras sensitive to other wavelengths are possible. Camera array 404 is connected to power and data lines 408 which provide power to camera array 404 from power source 410 and allow transmission of data back and forth to controller 412. Power source 410 may be any convenient means for generating electrical power for camera array 404. Controller 412 may be a processor configured to control operation of camera array 404 as well as for controlling operation of gas line 414, and even possibly for controlling operation of compaction roller 416. Compaction roller 416 applies and compacts tape 415 to surface 417. Controller 412 may be the feedback controller described with respect to FIG. 3. Although a compaction roller is depicted, other types of rollers and compaction devices are contemplated by the illustrative embodiments. Controller 412 can cause camera array 404 to automatically zoom in on gas impingement point 482 (see FIG. 4). Aiming camera array 404 may be automated. Aiming camera array 404 may include zooming-in specifically on a gas stagnation point, on a detected inconsistency, on a particular portion of tape 415 other aspects of gas flow on gas impingement point 482, or combinations thereof. Aiming may also be performed automatically using a feedback system in which camera array 404 is automatically controlled to follow one or more aspects of the inspection or monitoring process, such as for example to keep track of moving stagnation points. Many other combinations and uses of aiming and zooming camera array 404 are contemplated. As discussed further below, a similar aiming system for the gas nozzle 406 relative to composite member 417 is provided. Additionally, also as described below, a controller 412 may control gas flow volume and laminar gas flow control.

Returning to effector frame 402, as indicated above, this component also holds gas nozzle 406. Gas nozzle 406 may be configured to emit a jet of laminar flow of gas, such as but not limited to air, nitrogen, helium, argon, or many other, preferably inert, gasses. Gas nozzle 406 is connected via gas line 414 to pressure source 418. Pressure source may be any suitable means for pressurizing gas and/or cooling gas for delivery to gas nozzle 406. The source of cool gas need not be the same as pressure source 418. In some illustrative embodiments, a suitable gas source other than air may be used, such as but not limited to helium, argon, neon, nitrogen, oxygen, or any other suitable gas for an intended tape laying or tape pressing operation.

Note that in the case of an infrared camera, camera array 404 may be used to measure a temperature of the gas, both as dispensed immediately from gas nozzle 406 and as that gas impinges on gas impingement point 482. In addition, other temperatures of surrounding areas, including but not limited to the recently laid layer 496, may be measured using the infrared camera. Temperature measurements are possible by noting wavelength differences in the infrared light, as detected by camera array 404, and correlating those detected wavelength differences to temperatures using a known mathematical formula.

The measurement of temperature of various aspects of the tape laying process and of the inspection process allow for temperature control feedback techniques. For example, if a different amount of contrast is needed to detect certain types of inconsistencies, then temperature readings can be used to control the temperature of the gas being dispensed from gas nozzle 406. In another illustrative embodiment, the starting, stopping, and speed of the actual tape laying and inspection processes can be adjusted based on desired temperature differences between the gas and the layer 496 of the tape. Other temperature feedback control mechanisms are contemplated.

The rate of gas flow is dependent on several factors including, but not limited to, (1) the spray dispersion properties of the gas source, (2) the selected type and diameter of orifice nozzle. As explained with respect to FIG. 10, the diameter of the nozzle could be adjustable. Note also that when camera array 404 is an infrared camera, feedback from the infrared camera could be used to measure dispensed gas temperature, the laminar nature of gas flow, dispersion patterns of gas flow, etc., for calibrating of the nozzle. In addition to (1) and (2) above, the rate of gas flow may also be dependent on (3) the distance from the outlet orifice to the datum surface being interrogated, and (4) the programmed spool speed of the tape applicator. Based on these factors, the rate of gas flow is constrained by a range of low velocity Reynolds numbers, Re, which envelope a minimum and maximum gas flow velocity that have been empirically determined. The gas flow may result in ideal vortex laminar flow properties for highest resolution in infrared detection capability. The Reynolds number is defined as $Re=\rho UD/\mu=UD/v$. For this equation, $\rho$ is the density of the gas source, U is the flow speed or velocity of the gas source, D is the characteristic length in this case the flow diameter which is determined by the orifice diameter, $\mu$ is the dynamic viscosity, and v is the kinematic viscosity of the gas source.

In an illustrative embodiment, effector frame 402 may be free floating with respect to the rest of apparatus 400, that is supported only by power and data line 408 and gas line 414. In other illustrative embodiments, effector frame 402 may be connected to some other portion of apparatus 400. In other illustrative embodiments, the air nozzle 406 and camera array 404 can be tilted on the rod 420 to move the impingement point 482 closer or further from the compaction nip 499. For example, rod 420 or other rigid member may connect effector frame 402 to a housing of apparatus 400, which in this case includes L-bracket 422 and L-bracket 424. Thus, the housing of apparatus 400 may be termed an L-shaped housing. However, many other housing shapes and types are contemplated. Nevertheless, for the illustrative embodiment shown in FIG. 5, together L-bracket 422 and L-bracket 424 may be termed a pair of L-shaped brackets.

Nevertheless, because effector frame 402 may be attached to and modify a pre-existing end effector, the housing and arrangement of components for apparatus 400 may vary tremendously. Thus, while apparatus 400 shows the use of L-bracket 422 and L-bracket 424 holding compaction roller 416 via axle 428, many other arrangements are possible for where and at what orientation effector frame 402 is placed on apparatus 400. Thus, for example, compaction roller 416 may or may not perform tape compaction. Other tape applicators are also possible and are not necessarily limited to a roller such as that shown in FIG. 5. Thus, for example, heater 458 (see FIG. 4) may be present to heat the tape.

However, effector frame 402 is connected to or associated with apparatus 400, effector frame 402 should be disposed with respect to apparatus 400 in such a way as to allow a cool gas jet from gas nozzle 406 to be directed onto tape as it is being laid by compaction roller 416 and subsequently inspected by camera array 404. Thus, effector frame 402 could be situated at different angles, and not necessarily vertically disposed with respect to apparatus 400, as shown in FIG. 4 and in FIG. 5.

Other variations are possible. For example, more ports may be provided for additional infrared cameras or for other types of cameras that operate at different wavelengths of light, including radio, microwave, infrared, visible, ultraviolet, and X-ray. Similarly, more than one gas nozzle may be present. Cameras of different types may be combined on one end effector frame. Multiple end effector frames may be provided for end effectors that have multiple tape applicators. Each of camera array 404 and gas nozzle 406 may be provided with individually controllable swivel mounts, such as mount 470 in combination with rotatable pin 472 or rotatable pin 474 and/or hinge 442 and hinge 443, such that camera array 404 and gas nozzle 406 may be directed towards different angles during operation of apparatus 400. One or more of these components may be actuated by one or more servo motors, such as servo motor 421.

The joints shown above for articulating one or more of camera array 404 and gas nozzle 406 may take different forms. For example, articulation may be accomplished through the use of spherical joints or other types of universal joints that allow for two or even three-dimensional articulation, with both camera array 404 and gas nozzle 406 being articulatable independently in some cases, thereby making both infinitely adjustable and capable of being aimed in any direction. In other illustrative embodiments, camera array 404 and gas nozzle 406 may be fixed relative to each other. Three-dimensional articulation means that camera array 404 and gas nozzle 406 may move up and down relative to center 486 of effector frame 402 along axis 488 (see FIG. 8), and may also twist back and forth about central axis 488 of effector frame 402 (see FIG. 8), and may also swivel back and forth about longitudinal axis of a hinge, such as about longitudinal axis 490 (see FIG. 8). The feedback sensing for the feedback control for positioning of the gas nozzle 406 and the camera array 404 relative the impingement point 482 could be provided by imaging from the camera array 404. Actuators could be provided to adjust the gas nozzle 406 and the camera array 404.

FIG. 6 through FIG. 9 show different perspectives of apparatus 400. Thus, these figures share common reference numerals which refer to similar structures as those described with respect to FIG. 4 through FIG. 9.

FIG. 6 illustrates a magnified view of the cooling jet, in accordance with an illustrative embodiment. In this view, the end effector 402 with camera array 404 and jet nozzle 406 are emphasized.

Figure 7:
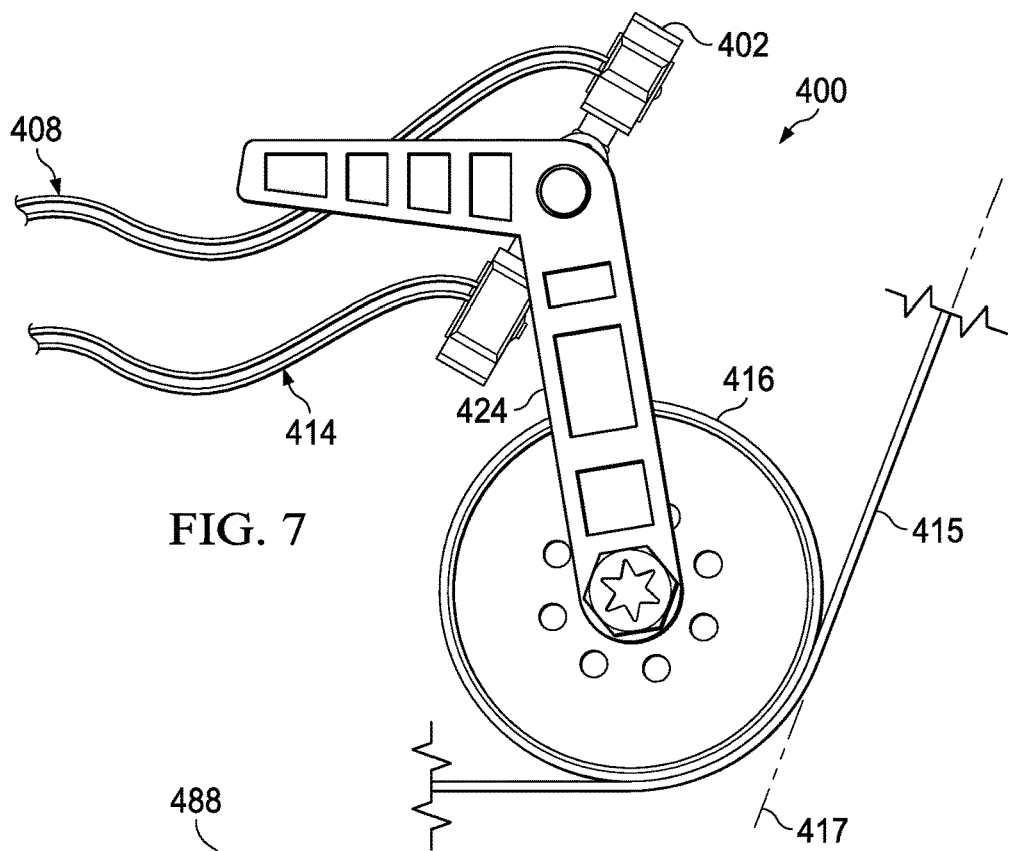
FIG. 7 illustrates a side view representation of the automatic fiber placement end effector shown in FIG. 6, in accordance with an illustrative embodiment.

FIG. 7 illustrates a side view representation of the automatic fiber placement end effector shown in FIG. 5, in accordance with an illustrative embodiment. Again, apparatus 400 is shown with effector frame 402, power and data line 408, gas line 414, L-bracket 424, and compaction roller 416. Tape 415 may extend out of view relative to what is shown in FIGS. 5 and 7; for example, see FIG. 4 for one possible arrangement of tape 415.

The illustrative embodiments enable at least two different configurations. The first configuration is an equivalent number of gas sources and sensors as parallel tape tow applicators. The second configuration, depending on tow width and number of parallel applicators, is a single gas source or sensor package that could be used for the entire applicable area. The preferred configuration would be dependent on manufacturing trials, data collection, and costs of the source or sensor package.

Additionally, multiple compaction rollers, effector frames, gas nozzles, and camera arrays may be present. For example, there could be 8, 16, 24, 32, or more or fewer devices, arranged in parallel or otherwise, dispensing and compacting tape simultaneously and being sensed by 8, 16, 24, 32, or more or fewer gas nozzles and camera arrays. In other illustrative embodiments, one sensor system could deal with more than one tape tow. Still further variations are possible.

With regard to the laying of tape, tape is laid until the end of the tape laying path is reached with the gas flowing over the heated and just compacted tape to continuously sense the surface just laid until the end of the path is reached. A trigger between the compaction roller activation and the gas flow may be present from the controller to control gas flow and camera actuation.

Figure 8:
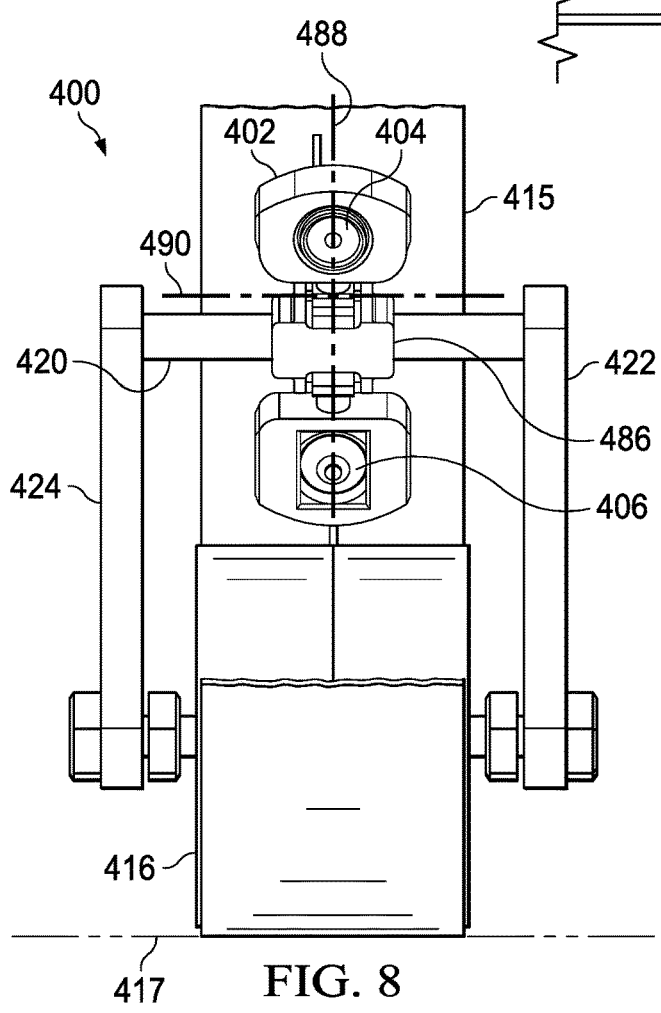
FIG. 8 illustrates a front view representation of the automatic fiber placement end effector shown in FIG. 6, in accordance with an illustrative embodiment.

FIG. 8 illustrates a front view representation of the automatic fiber placement end effector shown in FIG. 4, in accordance with an illustrative embodiment. Again, apparatus 400 is shown with effector frame 402, camera array 404, gas nozzle 406, L-bracket 422, L-bracket 424, and compaction roller 416. Center 486 of effector frame 402, along with central axis 488 and longitudinal axis 490 are shown for reference.

Figure 9:
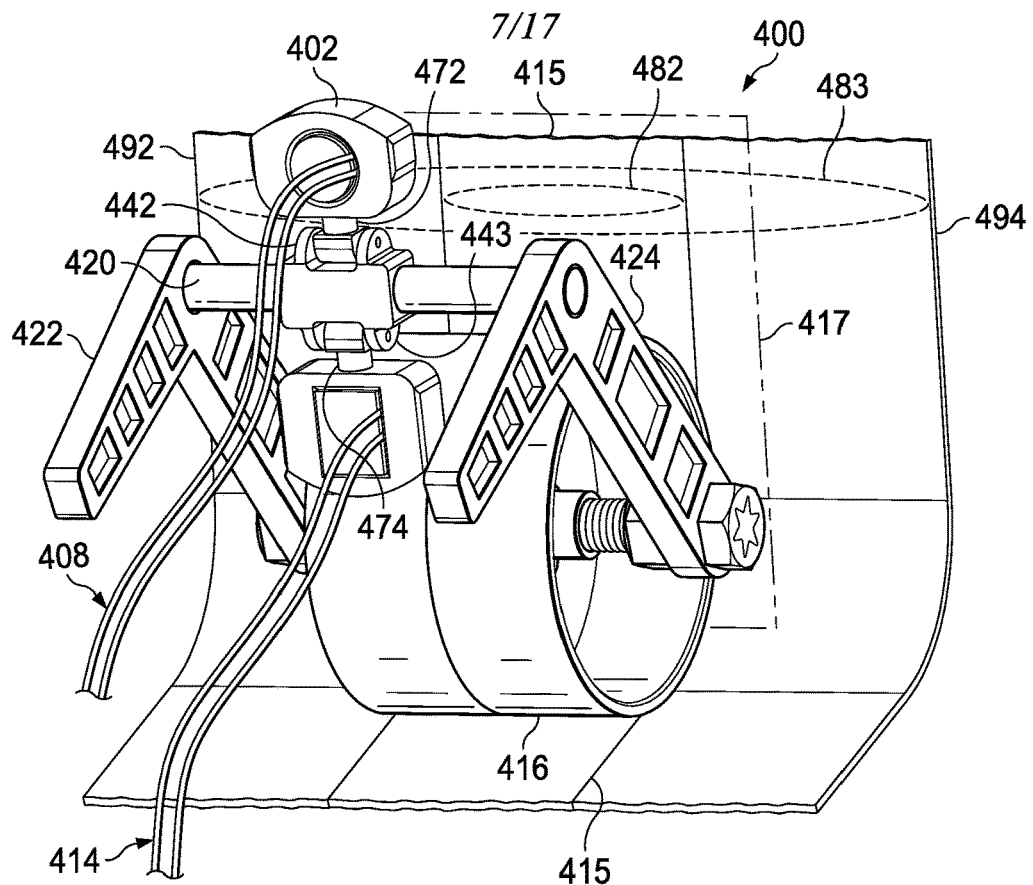
FIG. 9 illustrates a rear overhead view representation of the automatic fiber placement end effector shown in FIG. 5, in accordance with an illustrative embodiment.

FIG. 9 illustrates a rear overhead view representation of the automatic fiber placement end effector shown in FIG. 4, in accordance with an illustrative embodiment. Again, apparatus 400 is shown with effector frame 402, power and data line 408, gas line 414, L-bracket 422, L-bracket 424, and compaction roller 416.

In some illustrative embodiments, configuring the gas nozzle fixed orthogonal to the impinging surface would be preferable. In this case, a programmed, servo-control arm, such as servo 421, can manipulate rotation angle of the camera array. The control arm could be rod 420 controlled by servo motors 421. In the figures shown, the camera array and gas nozzle may be statically configured in the same plane; however, in FIG. 11 and FIG. 12, the infrared detector is shown orthogonal to flow direction.

Alternatively, or in addition, rotatable pin 472 and rotatable pin 474, together with and hinge 442 and hinge 443, may allow camera array 404 and gas nozzle 406 to rotate to the right and left relative to compaction roller 416. Rotatable pin 472 and rotatable pin 474 may exist at the midpoint of end effector 402, and the incident camera angle could be varied continuously from 0 degree (orthogonal to tape surface and parallel to flow direction) to 90 degrees (orthogonal to flow direction and parallel to tape surface). Some illustrative embodiments may not need variable control of hinge 442, hinge 443, rotatable pin 472 or rotatable pin 474.

In this case, a permanent L shaped sensor housing would be used. For this illustrative embodiment, gas nozzle 406 is assembled on one side of the housing, such as L-bracket 422 or L-bracket 424, and camera array 404 is assembled on the orthogonal plane of the other L-bracket. Still other arrangements are possible. Thus, the illustrative embodiments are not necessarily limited to these examples.

The view shown in FIG. 9 also helps to show gas impingement point 482 as being, potentially, more than a single point on tape 415. Again, gas impingement point 482 is an area where laminar gas flow from gas nozzle 406 impinges on tape 415. Gas impingement point 482 may be termed an inspection area. In the example shown in FIG. 9, gas impingement point 482 is about a width of tape 415. However, in other illustrative embodiments, gas impingement point 482 may be smaller than the width of tape 415, including possibly a very small area within tape 415 (that is, an inspection of a narrow band within tape 415).

In still other illustrative embodiments, gas impingement point may be wider than tape 415. For example, assume that multiple tapes are being laid in parallel next to apparatus 400, as indicated by tape 492 and tape 494. (Additional apparatuses similar to apparatus 400 are omitted from FIG. 9 for clarity, but these are impliedly present for laying down these additional rows of tape—additional inspection tools like those described above may or may not be present on these additional tape-laying apparatuses. In this case, gas impingement point 482 may be a width of multiple tapes simultaneously, such as including an area on tape 415 as well as part of all of widths of tape 492 and tape 494. When gas impingement point 482 extends across part or all of the widths of tape 492 and tape 494, camera array 404 (or possibly multiple camera arrays on multiple apparatuses) may be used to inspect multiple tapes simultaneously within the relatively large gas impingement point 482. Of course, when multiple apparatuses are used, each with their own camera array and gas nozzle, then one or more controllers may inspect the different tapes being laid, independently.

For example, large gas impingement point 483 is shown in FIG. 9. Large gas impingement point 483 is deemed "large" simply because it is larger than gas impingement point 482. Large gas impingement point 483 extends across all three tapes, tape 415, tape 492, and tape 494, and all three are inspected using camera array 404 simultaneously in this particular illustrative embodiment.

In yet another variation, gas impingement point 482 and large gas impingement point 483 may be have a variety of shapes, not just the elliptical shapes shown in FIG. 9. Additional shapes may be accomplished by varying the gas nozzle 406, as described, for example, with respect to FIG. 10.

Thus, many variations of the illustrative embodiments are possible. Accordingly, the examples described with respect to the figures do not necessarily limit the other illustrative embodiments described herein.

Figure 10:
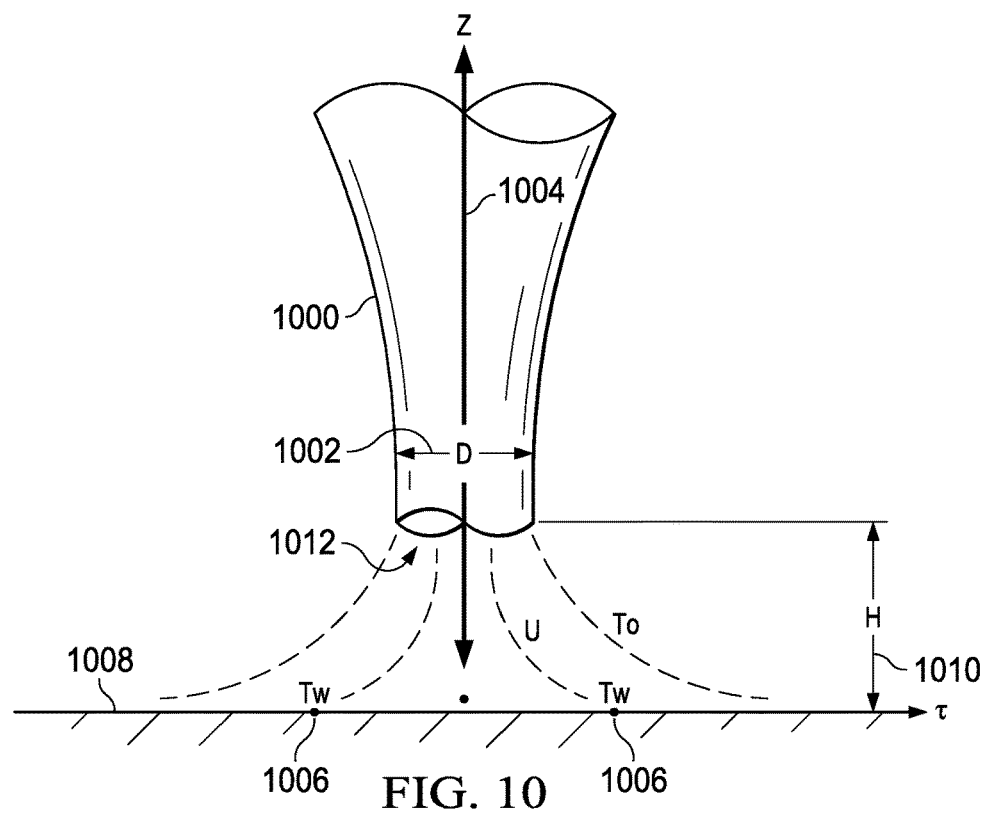
FIG. 10 illustrates the automated fiber placement end effector of FIG. 5 in use, together with flow and stagnation characteristics of a jet impinging on a flat surface, in accordance with an illustrative embodiment.

FIG. 10 illustrates the automated fiber placement end effector of FIG. 4 through FIG. 9 in use, together with flow and stagnation characteristics of a jet impinging on a flat surface, in accordance with an illustrative embodiment. Nozzle 1000 may be nozzle 406 in FIG. 4 through FIG. 9. Nozzle 1000 is defined by an aperture having diameter, D 1002, and a central axis, Z 1004.

Note that nozzle 1000 has an end 1012. End 1012 is shown as circular in FIG. 10. However, end 1012 may have a variety of different shapes, such as but not limited to oblong (for wider gas flow impingement points), square (for different gas flow patterns), or any other desirable shape. The aperture size of the nozzle could be variable and the variability could be automated. A width or diameter of end 1012 may change a size of a gas impingement point, as described with respect to FIG. 9, and/or possibly a distribution profile of gas from end 1012 of nozzle 1000. A distribution profile of gas may be, and preferably is, a laminar gas flow. However, the distribution profile need not be laminar in some illustrative embodiments, and whether laminar or non-laminar, the gas distribution profile may be a jet of gas or some other stream of gas. Thus, the illustrative embodiments are not necessarily limited to the example shown in FIG. 10.

Gas flow is shown by the arrows in FIG. 10. A wall jet region forms along between points Tw 1006 on surface 1008 (corresponding to a surface of tape 417, for example), though a stagnation point forms near the central axis, Z 1004 of nozzle 1000. Flow arcs "U" and "$T_0$" are shown in FIG. 10. Nozzle 1000 is disposed at a height "H" 1010 above surface 1008.

One configuration of the illustrative embodiments is orthogonal flow direction to the layup surface. However, alternate configurations are possible and would best be determined during manufacturing trials for a particular project.

In terms of flow characteristics, however, two configurations are described. Each flow configuration potentially has their own unique benefits. For example, in one configuration, in which the flow is directed normal to the layup surface, what is meant by "laminar" is in direct reference to the initial flow velocity and streamline properties as it exits the orifice outlet, well before or "upstream" of making contact on an impinging surface. The flow is termed "laminar" as it maintains an enveloping space of Reynolds numbers, Re, which are dimensionless. Laminar flow is typically characterized by Re less than about 2300. For Reynolds numbers greater than this threshold, the flow begins to transition with undesirable turbulent qualities. Laminar flow is also dependent on the gas source, flow velocity, and orifice diameter. Once the flow orthogonally impacts the "wall" or impinging surface, vortex flow and turbulent mixing of gas can occur, and a boundary layer will form.

In another configuration, gas flow is parallel to the layup surface. In this case, a smooth boundary layer will form immediately. Inconsistencies, or topographical anomalies in the control volume or layup surface could cause turbulent mixing of gas in this case. However, stagnation will not be as prevalent or obvious of a central feature in the imagery.

The first configuration described above provides the best opportunity to monitor variations in the spatial features of the stagnation point region (velocity=0) on the layup surface. The first configuration provides this best opportunity because the nominal stagnation signature on a flat pristine layup surface will present symmetry. In contrast, stagnation signature on a surface with inconsistencies will appear asymmetric, in which case the inconsistency will be easily identified.

Other flow patterns are also possible. For example, gas flow need not be orthogonal or parallel to the surface of tape 417, but could also be at any other angle in between.

Figure 11A:
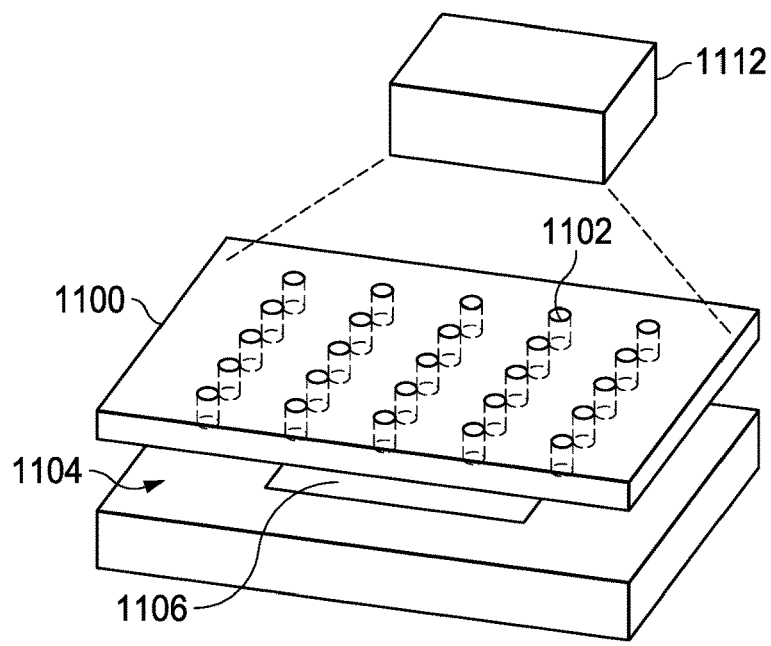
FIG. 11A illustrates a flat plate with multiple jet orifices, in accordance with an illustrative embodiment.
Figure 11B:
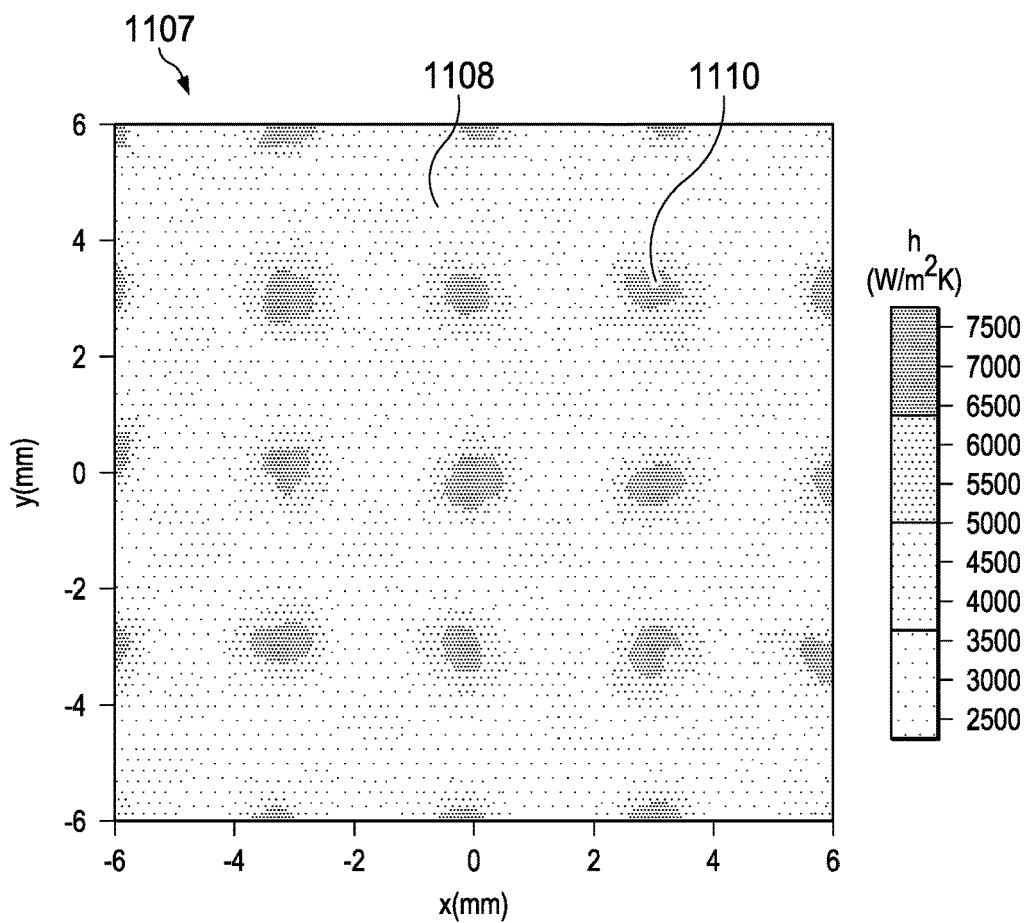
FIG. 11B illustrates a top view of a two-dimensional contour plot indicating gas flow stagnation points projected onto a flat plate, which are concentric to the locations of the jet orifices, in accordance with an illustrative embodiment.

FIG. 11A illustrates a flat plate with multiple met orifices. FIG. 11B illustrates a top view of a two-dimensional contour plot 1108 indicating gas flow stagnation points, such as point 1110, projected onto a flat plate 1104 (FIG. 11A). The gas flow stagnation points such as stagnation point 1110, are concentric to the locations of the jet orifices, such as jet orifices 1102, in accordance with an illustrative embodiment.

FIG. 11a shows flat plate 1100 includes jet orifices 1102 being blown onto flat plate 1104. Flat plate 1104 may be a heated surface. Note that because, in the illustrative embodiments, the gas jet is cool, a tape laying device may be considered "heated" relative to the gas jet. This temperature difference may be because the gas is cooled, the tape or tape laying device is heated, or a combination of both. Graph 1107 in FIG. 11b shows jet stagnation regions 1108 where cold gas rests against flat plate 1104.

FIG. 11b indicates a two-dimensional contour plot 1107 indicating gas flow stagnation points 1108 projected onto a flat plate 1104, which are concentric to the location of the jet orifices 1102. This data output is captured from a high-resolution infrared camera, and is the most similar computational method (i.e., infrared photogrammetry) for capturing the skin inconsistencies detectable using the illustrative embodiments.

Unlike this example, for non-flat surfaces (i.e., which would be created from inconsistencies such as a wrinkle or foreign object debris), the out-of-plane curvatures and ridges create a distorted thermal contour plane that changes the shape of the jet stagnation region 1108, preventing it from being concentric to the nozzle or jet orifices 1102. As used herein, "concentric" refers to the stagnation point being concentric to the jet impingement point on the laid-up surface.

Infrared camera 1112 captures this data, as in the illustrative embodiment shown in FIG. 11, flat plate 1100 is substantially transparent to infrared light, or whatever wavelength of light is being used. Computational digital image correlation techniques are used to flag the inconsistency and alert the fabrication team. It is these changes to the stagnation region, such as stagnation point 1110, which allow infrared camera 1112 to detect inconsistencies in the workpiece surface 1106 that should be dispositioned. Inconsistencies that should be dispositioned are those that are out of tolerance, not just those inconsistencies that are detected and identified.

Digital image correlation is a widely used computational tool for calculations related to photogrammetry techniques. A control image(s) is used, one that represents the pristine stagnation signatures of the impinging flow at a predetermined speed, gas type, and angle. There will be a range of acceptable stagnation signatures. This range is determined from manufacturing trials and concurred by a stress and structures team, as it relates specifically to wrinkle dimensions and characteristics. This range can be used as a means of determining whether an inconsistency is within or outside of tolerance. Thus, this range is a way to calibrate or understand the output and characterize it so that a user would know the meaning of what is being detected or the nature of what is being detected)

From this control group, a database stores this information. As raw inspection data is processed, the computer completes computations that characterize the pixel mapping. This process includes, but is not limited to, fast Fourier transform, short-time Fourier transform, continuous wavelet transform, and digital image correlation techniques.

For plain weave fabric, the geometry and positioning of the weave itself could be used to correlate multiple images. For uniaxial-tape or slit tape, a simple infrared laser pointer that is positioned at the exact spatial location on each image during acquisition will provide a universal reference point to be used during post-processing. Inconsistencies in the form of distortion (i.e. caused by wrinkles) of the weave pattern (or other point of reference) would be detected by comparing pixel by pixel of each raw image to the control database of images. Thresholds or flags in the controller are directly tied to the allowances the design and stress and structures teams deem appropriate. Again, this technique may be a means of determining whether an inconsistency is within or outside of tolerance.

FIG. 12 illustrates a series of graphs showing flow behavior of gas jet impinging on a variety of curved surfaces, in accordance with an illustrative embodiment. Thus, FIG. 12 is a variation of FIG. 11b.

Graphs 1200 show the appearance of stagnation points on differently shaped surfaces, such as surface 1202, surface 1204, surface 1206, surface 1208, surface 1210, and surface 1212 over workpieces of various shapes. An example of such a workpiece is workpiece 1106 in FIG. 11B. This information can be used to detect and characterize inconsistencies on a complexly contoured workpiece by noting differences between expected stagnation points and observed stagnation points.

Figure 13:
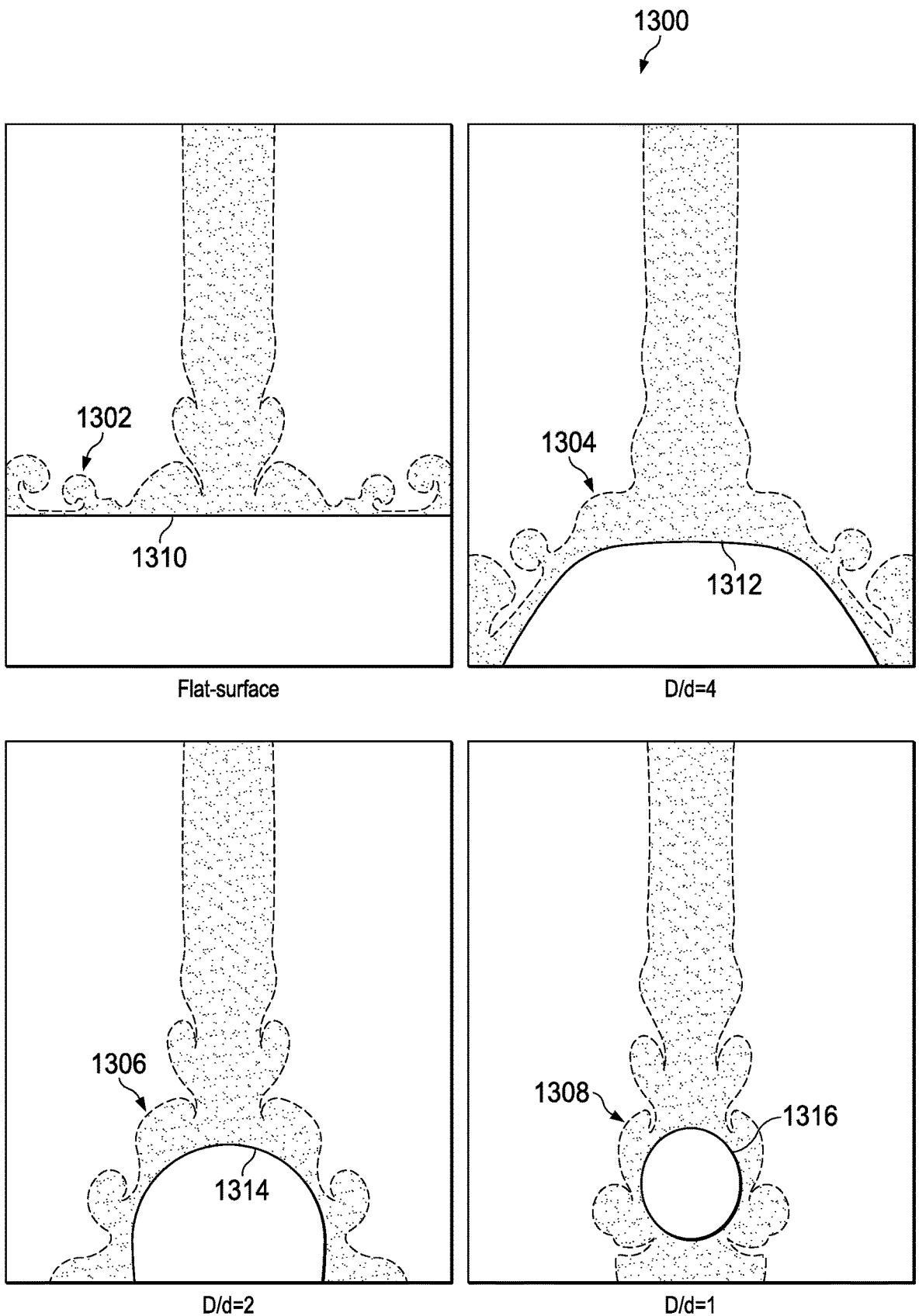
FIG. 13 illustrates effects of a gas jet impinging on complex cylinders, in accordance with an illustrative embodiment.

FIG. 13 illustrates effects of a gas jet impinging on complex cylinders, in accordance with an illustrative embodiment. FIG. 13 is a variation of FIG. 11b and FIG. 12.

Graphs 1300 show the appearance of stagnation points, such as stagnation point 1304, stagnation point 1306, and stagnation point 1308 over different workpieces, such as workpiece 1310, workpiece 1312, workpiece 1314, and workpiece 1316 of various shapes. This information can be used to detect and characterize inconsistencies on a complex workpiece, such as workpiece 1312, workpiece 1314, and workpiece 1316, by noting differences between expected stagnation points and observed stagnation points.

Mushroom-shaped vortex dipoles, such as vortex dipole 1302 can also be used to detect the presence of inconsistencies. As described above with respect to turbulent flow, flow exiting the orifice is, by design, laminar substantially without turbulence. The vortex turbulent flow is stimulated by the effects of uneven surface geometries caused by inconsistencies.

FIG. 14A through FIG. 14C should be read together. FIG. 14A illustrates a pristine flat layup surface without inconsistencies, as detected according to the illustrative embodiments, in accordance with an illustrative embodiment. FIG. 14B illustrates an example of an inconsistency, as detected according to the illustrative embodiments, in accordance with an illustrative embodiment. FIG. 14C illustrates and example of a pressure distribution on the impingement surface of an underexpanded jet impinging on a flat surface at an inclined angle, in accordance with an illustrative embodiment. Together, FIG. 14A through FIG. 14C are representations of actual data taken using the techniques described with respect to FIG. 1 through FIG. 13.

For an infrared detector and flow direction orthogonal to layup surface, FIG. 14A shows a pristine infrared mapping on a workpiece when no inconsistencies exist. As can be seen in graph 1400, a fairly uniform series of concentric gas flow patterns (laminar flow), shown at area 1402.

FIG. 14B shows infrared mapping on a surface having an inconsistency; specifically, a wrinkled surface. Graph 1404 shows a smeared gas flow pattern (non-laminar flow) shown at area 1406. Graph 1408 shows another type of smeared gas flow pattern (non-laminar flow) shown at area 1409.

Graph 1410 in FIG. 14C is data taken using a different technology, and indicates pressure, in which the gas jet at an incline impinges on a surface. Instead of inclining the jet, the illustrative embodiments are looking to find inconsistencies that are naturally at an incident angle to the jet, causing the shown change in stagnation signature. Thus, FIG. 14C show that the illustrative embodiments are not only applicable to detecting inconsistencies in composites and tape, but also in coatings including but not limited to paint. Stated differently, the illustrative embodiments in FIG. 3 through FIG. 10 may be used to inspect a coating, such as but not limited to paint, using cool gas flow over a gas impingement point on the coating and data gathered from a camera array observing the gas impingement point to look for inconsistencies in the coating. For example, the camera array 404 and gas nozzle 406 described above could be attached to an automated painting device and used to inspect the just painted surface downstream of the application point. In this case, the gas impingement point or inspection area is just downstream of the paint application area.

Still further, the illustrative embodiments may also be used to inspect devices created using additive manufacturing techniques. For example, a camera array and gas nozzle may be directed at a gas impingement point comprising one or more areas on a product being built layer-by-layer by additive manufacturing. As each layer is added, inspection may be accomplished using the methods and apparatuses described with respect to FIG. 3 through FIG. 10 by blowing cool gas on the layers as they are added and then using the camera array to look for inconsistencies on those layers, in-situ and in real time.

Thus, in this specific example, the illustrative embodiments are primarily focused on inspecting the surface of the additively formed part. The goal of the additively formed part is to create a part by adding material and create a within-tolerance surface finish which would not need secondary processing to bring within tolerance. A version of the illustrative embodiments could be used to inspect the applied layers, but could also inspect the just-created surface looking for out-of-tolerance inconsistencies on the surface. The size of the inspection area could be sized to the additive manufacturing surface size increase due to additive manufacturing process.

Further yet, the illustrative embodiments may be used to inspect devices created using subtractive manufacturing, such as milling. For example, a camera array and gas nozzle may be directed at a gas impingement point comprising one or more areas on a product being formed by milling or otherwise removing material from a workpiece to create a finish surface. As the tool moves across the surface removing material, the inspection device attached to the tool can use the method of the illustrative embodiments to inspect the finish of the just created surface. The size of the inspection area could be sized to the removal size of the subtractive manufacturing process. The, inspection may be accomplished using the methods and apparatuses described with respect to FIG. 3 through FIG. 10 by blowing cool gas on the layers or areas as they are removed, and then using the camera array to look for inconsistencies on those layers or areas, in-situ and in real time.

In still other illustrative embodiments, the methods and apparatuses described with respect to FIG. 3 through FIG. 10 may be used to inspect devices manufactured using a fitting machine or a manufactured using a machine that binds or seals objects together. The bindings, fittings, seals, or seams may be inspected by blowing cool gas on the layers or areas as they are removed, and then using the camera array to look for inconsistencies on those bindings, fittings, seals, or seams, in-situ and in real time. These illustrative embodiments are especially fitting when the process moves across whatever workpiece is being worked upon. The inspection device can be attached to the device performing the operation and inspection can be performed as during the relevant manufacturing process.

Figure 15:
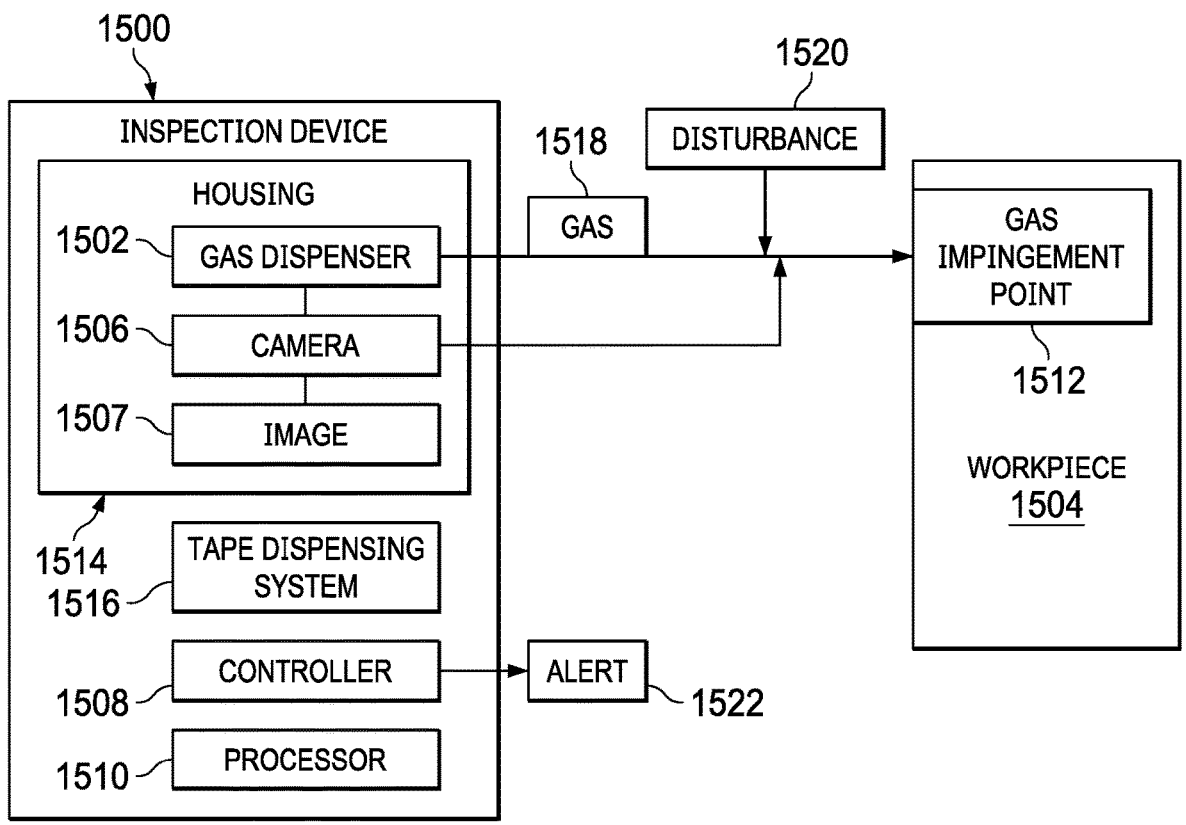
FIG. 15 is an illustration of an inspection device, in accordance with an illustrative embodiment.

Thus, the illustrative embodiments described herein are not necessarily limited to composite tape laying processes, such as those described with respect to FIG. 3 through FIG. 10. Still other applications are contemplated and not necessarily excluded by the examples provided above. FIG. 15 is an illustration of an inspection device, in accordance with an illustrative embodiment. In inspection device 1500 is a variation of the inspection devices described with respect to FIG. 3 through FIG. 14C.

Inspection device 1500 includes gas dispenser 1502 aimed at workpiece 1504. Inspection device 1500 also includes camera 1506 aimed at a gas impingement point on the workpiece.

Inspection device 1500 may also include controller 1508 controlling all of dispensing of a gas from gas dispenser 1502, camera 1506 to capture images, such as image 1507, and processor 1510 configured to process the images of gas impingement point 1512.

Inspection device 1500 may also include housing 1514 containing both the gas dispenser and the camera. Inspection device 1500 may also include tape dispensing system 1516 connected to housing 1514, the tape dispensing system configured to lay tape on the workpiece.

In another illustrative embodiment, gas dispenser 1502 is configured to emit a laminar gas flow. Gas 1518 may be air. Gas 1518 may be any other suitable gasses, as described above. The gas may be at a cold temperature, meaning less than a temperature of the workpiece. In another illustrative embodiment, camera 1506 is an infrared camera and the images comprise infrared images.

In another illustrative embodiment, controller 1508 may be configured to control gas dispenser 1502 to dispense gas 1518 onto gas impingement point 1512. In this case, controller 1508 may receive image 1507 from camera 1506 of gas impingement point 1512 while gas 1518 flows onto gas impingement point 1512. Controller 1508, using processor 1510, may then analyze image 1507 to determine whether disturbance 1520 in the flow of gas 1518 occurs. Controller 1508 may then, responsive to identifying disturbance 1520, transmit alert 1522.

The illustrative embodiments may be further varied. For example, the illustrative embodiments contemplate fabricating a portion of an aircraft using inspection device 1500. Thus, the illustrative embodiments are not necessarily limited by the example of FIG. 15. For a paint or coating inspection system, the tape dispenser could be replaced by a paint or coating applier, or an additive manufacturing material adding device, or a subtractive manufacturing tool, or the sealer, etc. The inspection device is attached to the tool performing the operation so that an inspection in-situ and in real time can occur.

Figure 16:
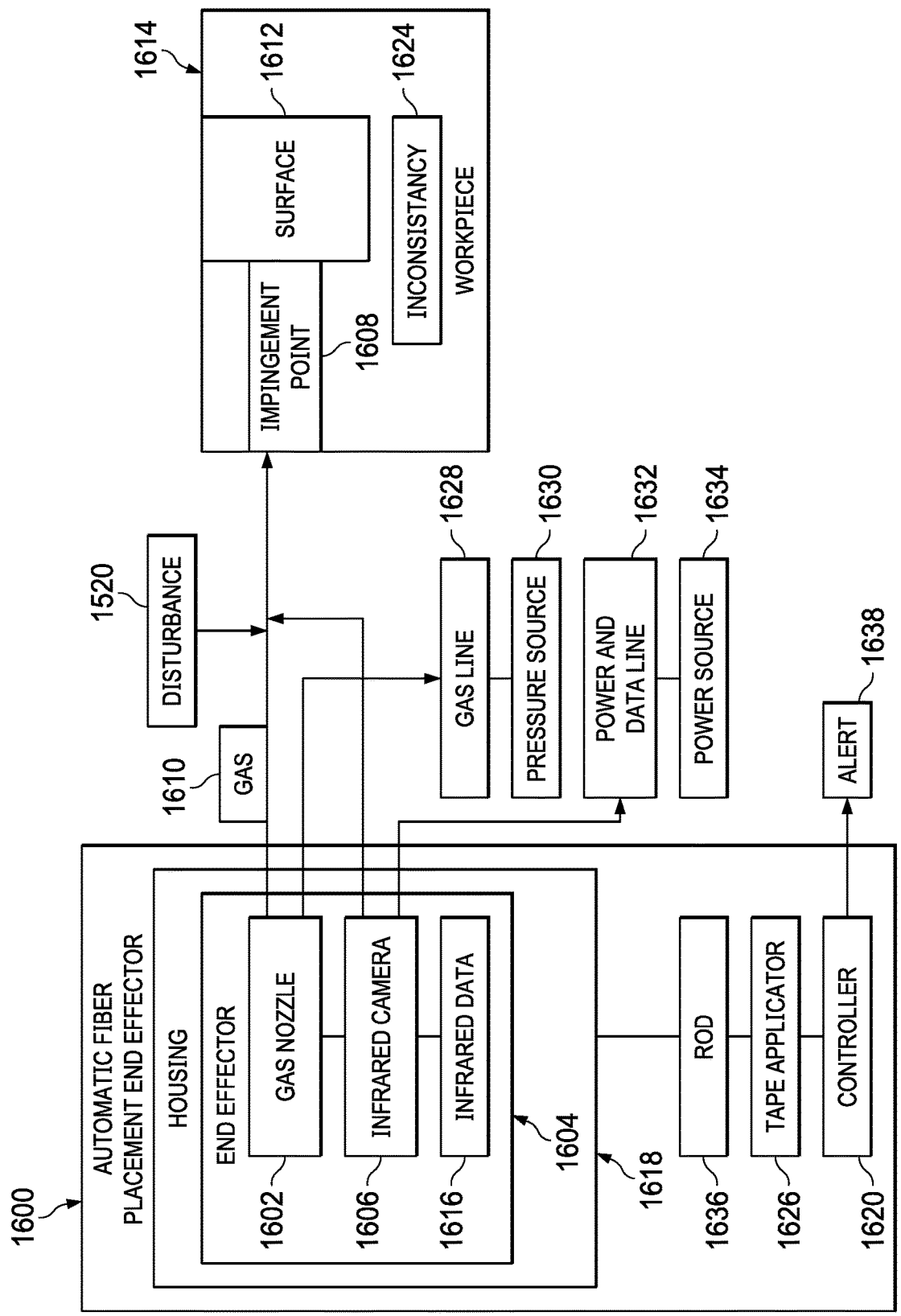
FIG. 16 illustrates an automatic fiber placement end effector, in accordance with an illustrative embodiment.

FIG. 16 illustrates an automatic fiber placement end effector, in accordance with an illustrative embodiment. Automatic fiber placement end effector 1600 includes gas nozzle 1602 connected to end effector 1604. Automatic fiber placement end effector 1600 also includes infrared camera 1606 directed at impingement point 1608 where gas 1610 from gas nozzle 1602 impinges on surface 1612 of workpiece 1614. Gas nozzle 1602 and infrared camera 1606 are pointed such that both gas 1610 is directable at workpiece 1614 and infrared data 1616 can be taken from workpiece 1614.

Automatic fiber placement end effector 1600 may be varied. For example, automatic fiber placement end effector 1600 may also include housing 1618 which end effector 1604 is connected. In another example, automatic fiber placement end effector 1600 may also include controller 1620 configured to retrieve infrared data 1616 from infrared camera 1606 and determine, based on infrared data 1616, whether inconsistency 1622 is present on workpiece 1614.

In an illustrative embodiment, controller 1620 may be further configured to control a direction, a pressure, and gas application during a tape laying sequence, and to control a temperature of gas 1610. In another illustrative embodiment, controller 1620 may be further configured to control a direction and a time of imaging of infrared camera 1606.

In still another illustrative embodiment, end effector 1604 holds both infrared camera 1606 and gas nozzle 1602. Gas 1610 may be air. Gas 1518 may be other gasses, as described above.

In yet another illustrative embodiment, automatic fiber placement end effector 1600 may also include tape applicator 1626 connected to housing 1618.

In a different illustrative embodiment, automatic fiber placement end effector 1600 may also include gas line 1628 connected to gas nozzle 1602. Automatic fiber placement end effector 1600 may also include pressure source 1630 connected to gas line 1628. Pressure source 1630 may be configured to pump gas 1610, gas 1610 being less than zero degrees Fahrenheit, into gas line 1628.

Furthering this illustrative embodiment, automatic fiber placement end effector 1600 may also include power and data line 1632 connected to infrared camera 1606. Automatic fiber placement end effector 1600 may also include power source 1634 connected to power and data line 1632. Automatic fiber placement end effector 1600 may also include controller 1620 connected to power and data line 1632. Controller 1620 may be configured to control operation of infrared camera 1606.

Furthering this example, controller 1620 may be further configured to use infrared data 1616 to confirm that gas nozzle 1602 dispenses a laminar flow of gas. Additionally, automatic fiber placement end effector 1600 may also include gas line 1628 connected to gas nozzle 1602. Automatic fiber placement end effector 1600 may also include pressure source 1630 connected to gas line 1628. Pressure source 1630 may be configured to pump gas 1610 into gas line 1628. Controller 1620 may be further configured to control operation of pressure source 1630. In another illustrative embodiment, gas nozzle 1602 and infrared camera 1606 are one of: pointed in a same direction and pointed in different directions.

In a still different illustrative embodiment, automatic fiber placement end effector 1600 may also include tape applicator 1626 connected to housing 1618. Housing 1618 may be a pair of L-brackets. Tape applicator 1626 may be connected to the L-brackets via a rod 1636. Rod 1636 may be rotatable pin 472 or rotatable pin 474 of FIG. 4.

Controller may be configured to issue alert 1638 if inconsistency 1624 is detected. Alert 1638 may take the form of an audio or visual alert, or may take the form of an electronic message displayed on a display screen. Alert 1638 may also be stored data which instructs either a computer process or a human user that inconsistency 1624 might bear further scrutiny.

Still other illustrative embodiments are contemplated. For example, the illustrative embodiments contemplate fabricating a portion of an aircraft using automatic fiber placement and automatic fiber placement end effector 1600. Thus, the illustrative embodiments are not necessarily limited to the examples shown in FIG. 16.

Figure 17:
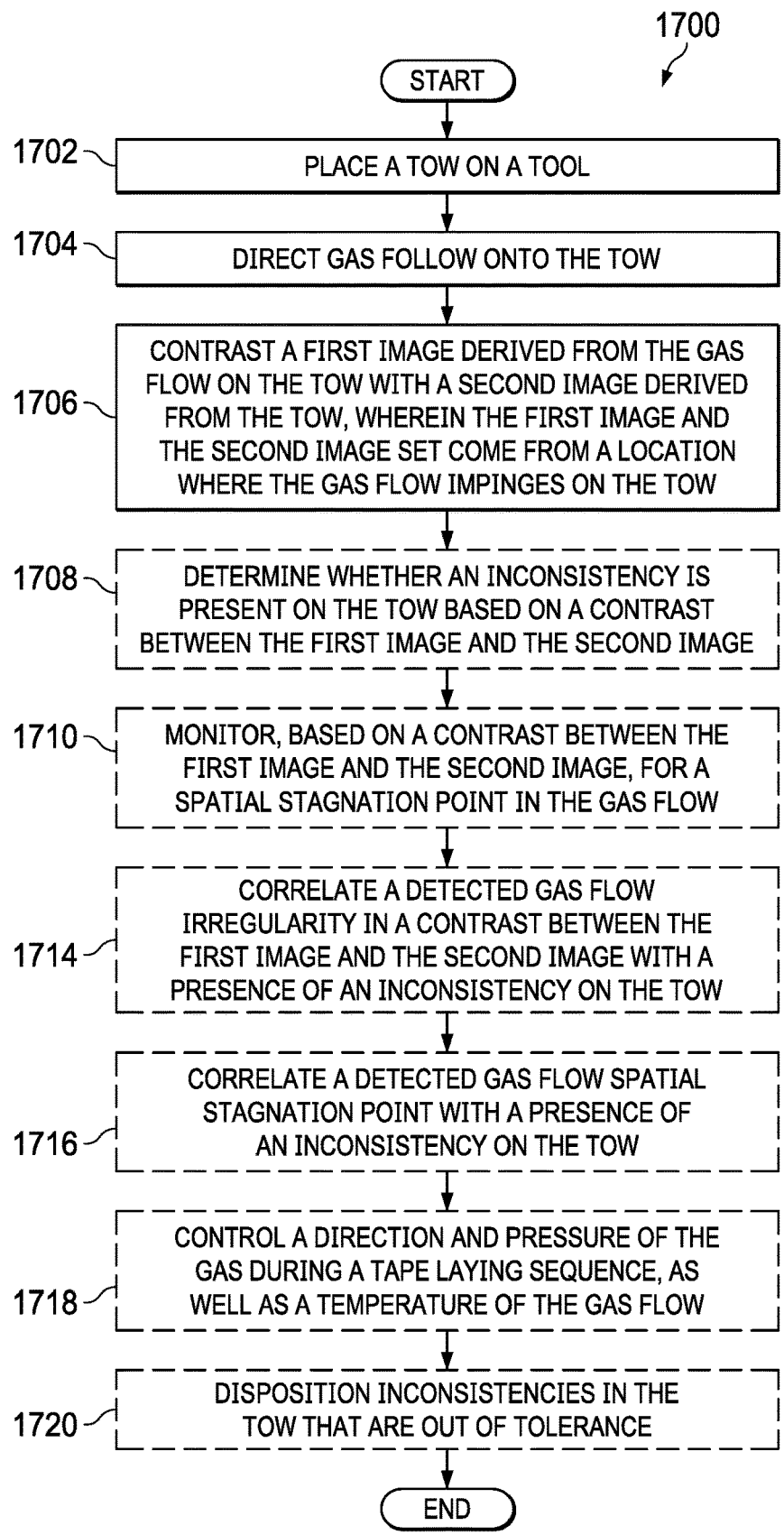
FIG. 17 is an illustration of a flowchart of a method of inspecting a structure, in accordance with an illustrative embodiment.

FIG. 17 is an illustration of a method of inspecting a structure, in accordance with an illustrative embodiment. Method 1700 is a variation of the methods described above with respect to FIG. 3 through FIG. 16. Optional operations of method 1700 are shown with dashed boxes.

Method 1700 includes placing a tow on a tool (operation 1702). Method 1700 also includes directing a gas flow onto the tow (operation 1704). Method 1700 also includes contrasting a first image derived from the gas flow on the tow with a second image derived from the tow, wherein the first image and the second image set come from a location where the gas flow impinges on the tow (operation 1706).

Method 1700 may be varied. For example, method 1700 also may include determining whether an inconsistency is present on the tow based on a contrast between the first image and the second image (operation 1708). In another example, method 1700 also may include monitoring, based on a contrast between the first image and the second image, for a spatial stagnation point in the gas flow (operation 1710). In an illustrative embodiment, the gas flow is chilled to zero degrees Fahrenheit or less, and the first image comprises an infrared image.

In yet another illustrative embodiment, method 1700 also may include correlating a detected gas flow irregularity in a contrast between the first image and the second image with a presence of an inconsistency on the tow (operation 1712). In still another illustrative embodiment, method 1700 also may include correlating a detected gas flow spatial stagnation point with a presence of an inconsistency on the tow.

In yet another illustrative embodiment, method 1700 also may include controlling a direction and pressure of the gas during a tape laying sequence, as well as a temperature of the gas flow (operation 1718). Method 1700 also may include continuing monitoring for a lag time to allow inspection at an end of a tape application run. Method 1700 also may include dispositioning inconsistencies in the tow that are out of tolerance (operation 1720). In one illustrative embodiment, the method may terminate thereafter.

Still other variations are possible. For example, the illustrative embodiments also contemplate a portion of an aircraft assembled according to the method 1700. Thus, the illustrative embodiments are not necessarily limited to the example provided in method 1700.

Figure 18:
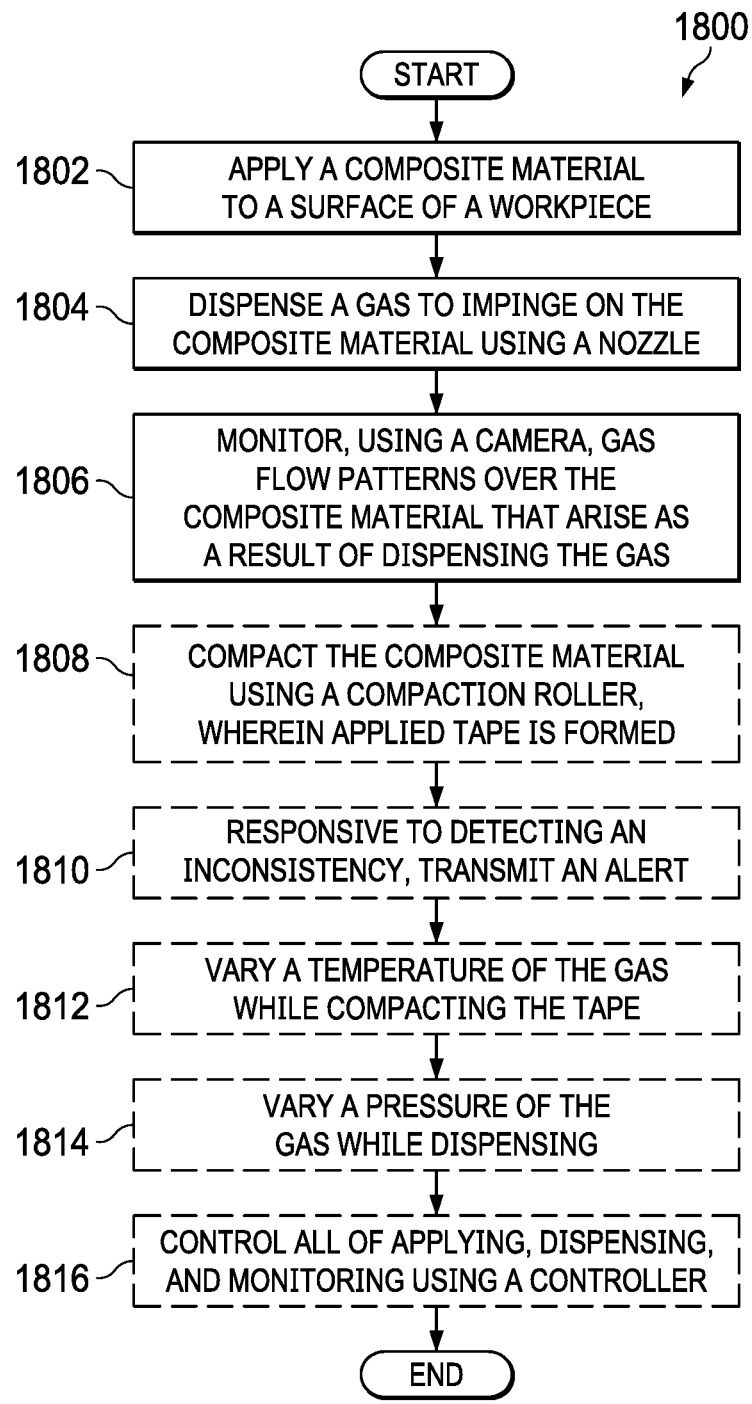
FIG. 18 is an illustration of a flowchart of a method of fabricating a composite structure, in accordance with an illustrative embodiment.

FIG. 18 is an illustration of a method of fabricating a composite structure, in accordance with an illustrative embodiment. Method 1800 is a variation of the methods and techniques described above with respect to FIG. 3 through FIG. 17. Operations that are optional with respect to method 1800 are shown with dotted boxes.

Method 1800 also includes applying a composite material to a surface of a workpiece (operation 1802). Method 1800 also includes dispensing a gas to impinge on the composite material using a nozzle (operation 1804). Method 1800 also includes monitoring, using a camera, gas flow patterns over the composite material that arise as a result of dispensing the gas (operation 1806).

Method 1800 may be varied. For example, method 1800 also may include compacting the composite material using a compaction roller, wherein applied tape is formed (operation 1808). Compacting may be performed upstream from a gas impingement point on the composite material.

The gas may be a cool laminar flow, wherein cool is defined as less than a temperature of the composite material. The camera is an infrared camera. Monitoring may include checking for changes to stagnation point patterns, wherein the changes arise as a result of an inconsistency in the composite material.

Method 1800 also may include, responsive to detecting an inconsistency, transmitting an alert (operation 1810). Method 1800 also may include varying a temperature of the gas while compacting the tape (operation 1812). Method 1800 also may include varying a pressure of the gas while dispensing (operation 1814). Method 1800 also may include controlling all of applying, dispensing, and monitoring using a controller (operation 1816). In one illustrative embodiment, the method may terminate thereafter.

Still other variations are possible. For example, the illustrative embodiments contemplate a portion of an aircraft assembled according to method 1800. Thus, the illustrative embodiments are not necessarily limited to the example provided in method 1800.

Figure 19:
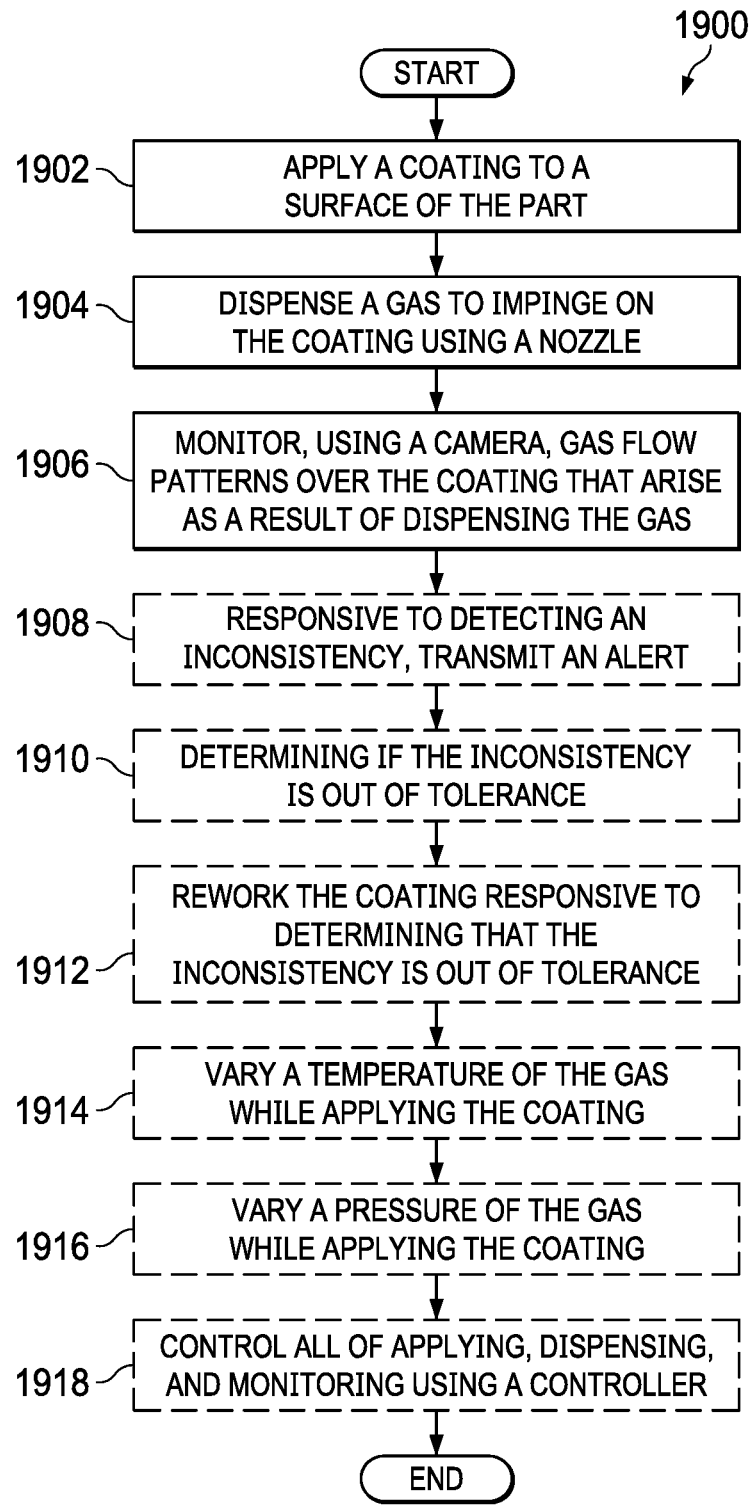
FIG. 19 is an illustration of a flowchart of a method of fabricating a part having a coating applied to a surface of the part, in accordance with an illustrative embodiment.

FIG. 19 is an illustration of a method of fabricating a part having a coating applied to a surface of the part, in accordance with an illustrative embodiment. Method 1900 is a variation of the methods and techniques described with respect to FIG. 3 through FIG. 18. Operations that are optional with respect to method 1900 are shown with dotted boxes.

Method 1900 includes applying a coating to a surface of the part (operation 1902). Method 1900 also includes, after applying, dispensing a gas to impinge on the coating using a nozzle (operation 1905). Method 1900 also includes monitoring, using a camera, gas flow patterns over the coating that arise as a result of dispensing the gas (operation 1906).

Method 1900 may be varied. For example, in an illustrative embodiment, the coating may be paint. In another illustrative embodiment, the gas is a cool laminar flow, wherein cool is defined as less than a temperature of the coating. The camera may be an infrared camera. Monitoring may include checking for changes to stagnation point patterns, wherein the changes arise as a result of an inconsistency in the coating.

Still other variations are possible. For example, method 1900 also may include, responsive to detecting an inconsistency, transmitting an alert (operation 1908). In this case, method 1900 also may include determining if the inconsistency is out of tolerance (operation 1910). Method 1900 also may include reworking the coating responsive to determining that the inconsistency is out of tolerance (operation 1912).

Still other variations are possible. For example, method 1900 also may include varying a temperature of the gas while applying the coating (operation 1914). Method 1900 also may include varying a pressure of the gas while applying the coating (operation 1916). Method 1900 also may include controlling all of applying, dispensing, and monitoring using a controller (operation 1918). In one illustrative embodiment, the method may terminate thereafter.

Yet other illustrative embodiments are contemplated. For example, the illustrative embodiments also contemplate a portion of an aircraft assembled according to method 1900. Thus, the illustrative embodiments are not necessarily limited by the examples provided with respect to method 1900.

FIG. 20 is an illustration of a method of inspecting a surface, in accordance with an illustrative embodiment. Method 2000 is a variation of the methods and techniques described with respect to FIG. 3 through FIG. 19. Operations that are optional in method 2000 are shown in dotted boxes.

Method 2000 includes directing a gas flow onto the surface (operation 2002). Method 2000 also includes monitoring for a spatial stagnation point in the gas flow (operation 2004). Method 2000 also includes correlating a detected gas flow spatial stagnation point with a presence of an inconsistency on the surface (operation 2006).

Method 2000 may be varied. For example, directing, monitoring, and correlating may be performed automatically. In another example, method 2000 may also include determining whether a detected inconsistency is out of tolerance (operation 2008). Additionally, method 2000 also may include dispositioning inconsistencies in the surface that are out of tolerance (operation 2010). In an illustrative embodiment, the gas flow comprises a cool gas, wherein cool is defined as a first temperature less than a second temperature of the surface. Cool also may be defined as being 32 degrees Fahrenheit or less. In another illustrative embodiment, monitoring for the spatial stagnation point may include using an infrared camera to monitor temperature distributions in the gas flow. In one illustrative embodiment, the method may terminate thereafter.

Still other variations are possible. For example, the illustrative embodiments also contemplate a portion of an aircraft assembled according to method 2000. Thus, the illustrative embodiments are not necessarily limited to the examples shown with respect to method 2000.

Illustrative embodiments of the disclosure may be described in the context of aircraft manufacturing and service method 2100 as shown in FIG. 21 and aircraft 2200 as shown in FIG. 22. Aircraft 2200 may be aircraft 100 of FIG. 1. The techniques described herein may be used to manufacture aircraft 2200 using aircraft manufacturing and service method 2100. The techniques described with respect to FIG. 21 and FIG. 22 may take advantage of the inspections systems, devices, and methods described with respect to FIG. 1 through FIG. 20.

Turning first to FIG. 21, an illustration of an aircraft manufacturing and service method is depicted in accordance with an illustrative embodiment. During pre-production, aircraft manufacturing and service method 2100 may include specification and design 2102 of aircraft 2200 in FIG. 22 and material procurement 2104.

During production, component and subassembly manufacturing 2106 and system integration 2108 of aircraft 2200 in FIG. 22 takes place. Thereafter, aircraft 2200 in FIG. 22 may go through certification and delivery 2110 in order to be placed in service 2112. While in service 2112 by a customer, aircraft 2200 in FIG. 22 is scheduled for routine maintenance and service 2114, which may include modification, reconfiguration, refurbishment, and other maintenance or service.

The inspection techniques described with respect to FIG. 2 through FIG. 20 may be applied with respect to service method 2100 and aircraft 2200. For example, the illustrative embodiments described above may be applied, for example, on at least manufacturing 2106, system integration 2108, service 2114, to build airframe 2202 and interior 2206.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of an aircraft is depicted in which an illustrative embodiment may be implemented. In this example, aircraft 2200 is produced by aircraft manufacturing and service method 2100 in FIG. 21 and may include airframe 2202 with plurality of systems 2204 and interior 2206. Examples of systems 2204 include one or more of propulsion system 2208, electrical system 2210, hydraulic system 2212, and environmental system 2214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2100 in FIG. 21.

In one illustrative example, components or subassemblies produced in component and subassembly manufacturing 2106 in FIG. 21 may be fabricated or manufactured in a manner similar to components or subassemblies produced while aircraft 2200 is in service 2112 in FIG. 21. As yet another example, one or more apparatus embodiments, method embodiments, or a combination thereof may be utilized during production stages, such as component and subassembly manufacturing 2106 and system integration 2108 in FIG. 21. One or more apparatus embodiments, method embodiments, or a combination thereof may be utilized while aircraft 2200 is in service 2112 and/or during maintenance and service 2114 in FIG. 21. The use of a number of the different illustrative embodiments may substantially expedite the assembly of and/or reduce the cost of aircraft 2200.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An automatic fiber placement end effector, comprising:
a gas nozzle connected to an end effector;
an infrared camera directed at an impingement point where a gas from the gas nozzle impinges on a surface of a workpiece, wherein the infrared camera is configured to capture infrared data of flow and stagnation characteristics of the gas moving over the surface of the workpiece; and
a controller configured to retrieve the infrared data from the infrared camera and determine, based on the infrared data, whether an inconsistency is present on the workpiece according to a detected gas flow spatial stagnation point on the surface of the workpiece.

2. The automatic fiber placement end effector of claim 1, further comprising:
a housing to which the end effector is connected.

3. The automatic fiber placement end effector of claim 1, wherein the controller is further configured to control a direction, a pressure, and gas application during a tape laying sequence, and to control a temperature of the gas.

4. The automatic fiber placement end effector of claim 1, wherein the controller is further configured to control a direction and a time of imaging of the infrared camera.

5. The automatic fiber placement end effector of claim 1, wherein an effector frame holds both the infrared camera and the gas nozzle.

6. The automatic fiber placement end effector of claim 1, wherein the gas comprises air.

7. The automatic fiber placement end effector of claim 1, further comprising:
a tape applicator connected to a housing.

8. The automatic fiber placement end effector of claim 1, further comprising:
a gas line connected to the gas nozzle; and
a pressure source connected to the gas line, the pressure source configured to pump the gas, the gas being less than zero degrees Fahrenheit, into the gas line.

9. The automatic fiber placement end effector of claim 8, further comprising:
a power and data line connected to the infrared camera; and
a power source connected to the power and data line, and wherein the controller is connected to the power and data line.

10. The automatic fiber placement end effector of claim 1, wherein the controller is further configured to use the infrared data to confirm that the gas nozzle dispenses a laminar flow of gas.

11. The automatic fiber placement end effector of claim 9, further comprising:
a gas line connected to the gas nozzle; and
a pressure source connected to the gas line, the pressure source configured to pump the gas into the gas line, and wherein the controller is further configured to control operation of the pressure source.

12. The automatic fiber placement end effector of claim 1, wherein the gas nozzle and the infrared camera are one of: pointed in a same direction and pointed in different directions.

13. The automatic fiber placement end effector of claim 1, further comprising:
   a tape applicator connected to a housing, wherein the housing comprises a pair of L-brackets, and wherein the tape applicator is connected to the L-brackets via a rod.

14. A method of inspecting a surface, the method comprising:
   directing a gas flow onto the surface;
   monitoring for a spatial stagnation point in the gas flow; and
   correlating a detected gas flow spatial stagnation point with a presence of an inconsistency on the surface.

15. The method of claim 14, wherein directing, monitoring, and correlating are performed automatically.

16. The method of claim 14, further comprising:
   determining whether a detected inconsistency is out of tolerance.

17. The method of claim 14, further comprising:
   dispositioning inconsistencies in the surface that are out of tolerance.

18. The method of claim 14, wherein the gas flow comprises a cool gas, wherein cool is defined as a first temperature less than a second temperature of the surface.

19. The method of 18, wherein cool is further 32 degrees Fahrenheit or less.

20. The method of claim 19, wherein monitoring for the spatial stagnation point comprises using an infrared camera to monitor temperature distributions in the gas flow.

21. The method of claim 14, wherein the gas flow is laminar.

22. The automatic fiber placement end effector of claim 1, wherein the end effector is configured to lay the workpiece onto a mandrel.

23. The automatic fiber placement end effector of claim 13, wherein the tape applicator comprises a compaction roller.

* * * * *